United States Patent
Honda et al.

(10) Patent No.: US 8,527,691 B2
(45) Date of Patent: Sep. 3, 2013

(54) NONVOLATILE MEMORY DEVICE AND NONVOLATILE MEMORY SYSTEM WITH FAST BOOT CAPABILITY

(75) Inventors: Toshiyuki Honda, Kyoto (JP); Masayuki Toyama, Osaka (JP); Masahiro Nakanishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 231 days.

(21) Appl. No.: 12/665,064

(22) PCT Filed: Jul. 30, 2008

(86) PCT No.: PCT/JP2008/002039
§ 371 (c)(1),
(2), (4) Date: Dec. 17, 2009

(87) PCT Pub. No.: WO2009/016832
PCT Pub. Date: Feb. 5, 2009

(65) Prior Publication Data
US 2010/0169558 A1     Jul. 1, 2010

(30) Foreign Application Priority Data
Jul. 31, 2007  (JP) .................................. 2007-198564

(51) Int. Cl.
G06F 13/00     (2006.01)
(52) U.S. Cl.
USPC .................................. 711/103; 711/E12.084
(58) Field of Classification Search
None
See application file for complete search history.

(56) References Cited

U.S. PATENT DOCUMENTS

| | | | |
|---|---|---|---|
| 2004/0139310 A1 | 7/2004 | Maeda et al. | |
| 2006/0282446 A1* | 12/2006 | Suzuki et al. | 707/100 |
| 2007/0043938 A1 | 2/2007 | May et al. | |
| 2007/0174602 A1* | 7/2007 | Kao | 713/2 |
| 2008/0162858 A1* | 7/2008 | Moyer | 711/170 |
| 2010/0122017 A1* | 5/2010 | Toyama | 711/103 |

FOREIGN PATENT DOCUMENTS

| | | |
|---|---|---|
| JP | 62-221034 | 9/1987 |
| JP | 2004-086505 | 3/2004 |
| JP | 2005-107938 | 4/2005 |
| JP | 2006-221807 | 8/2006 |
| WO | 2005/071529 | 8/2005 |

OTHER PUBLICATIONS

International Search Report for corresponding application No. PCT/JP2008/002039 mailed Sep. 30, 2008.
Form PCT/ISA/237.
English translation of the International Preliminary Report on Patentability for application No. PCT/JP2008/002039 dated Mar. 4, 2010.

\* cited by examiner

*Primary Examiner* — Edward Dudek, Jr.
*Assistant Examiner* — Sean D Rossiter
(74) *Attorney, Agent, or Firm* — Renner, Otto, Boisselle & Sklar, LLP

(57) ABSTRACT

A nonvolatile storage device includes a controller and a nonvolatile memory. The controller has: a logical-physical address conversion part for converting a logical address designated by a host device into a physical address; and a boot code address conversion part for converting boot code address information designated by the host device into a physical address. After the power-on and before the logical-physical address conversion part becomes usable, a boot code is read from a part of region which can be accessed by designating a logical address from the host device by designating the boot code address information from the outside. Thus, it is possible to rapidly start the nonvolatile memory system after the power-on. In the state where the logical-physical address conversion part can be used, data-reading and data-writing are carried out by designating a logical address from the host device.

2 Claims, 19 Drawing Sheets

F I G. 5
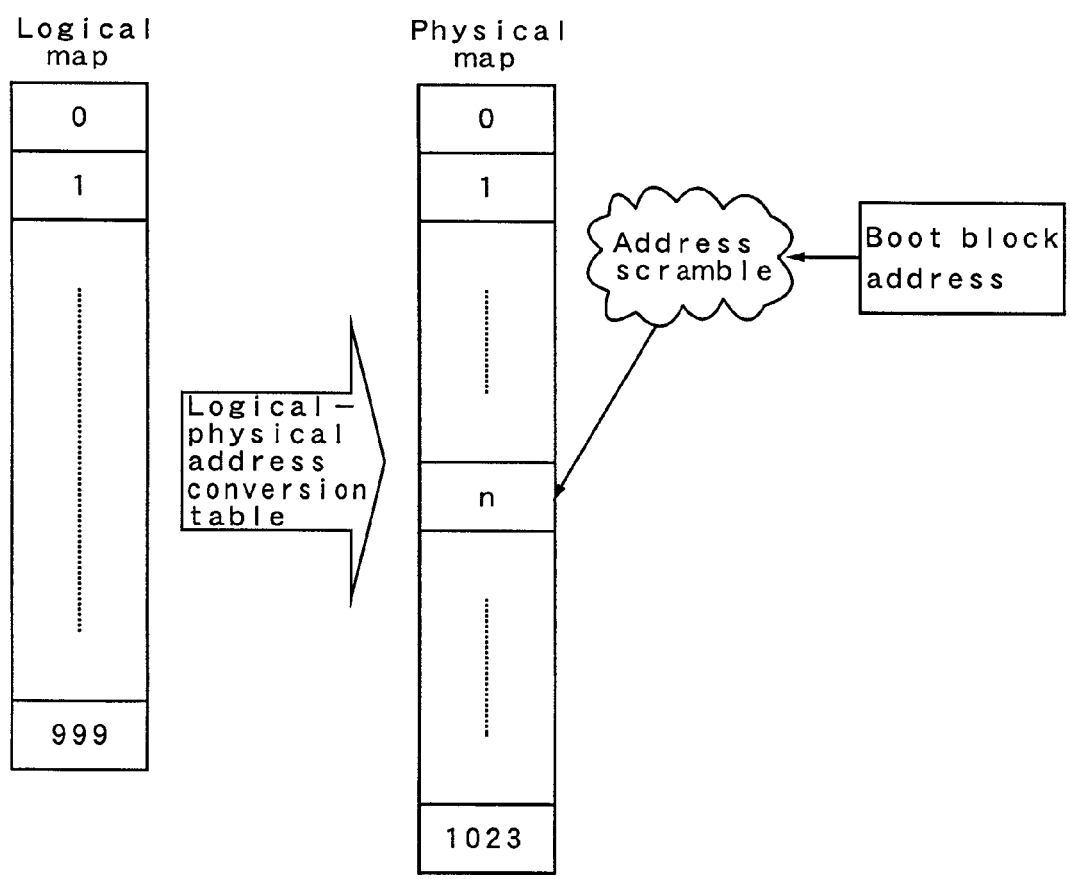

F I G. 1 2

| Partition number | Physical address related to first logical address |
|---|---|
| 0 | 456 |
| 1 | 789 |
| ⋮ | ⋮ |
| n | 123 |

F I G. 1 3
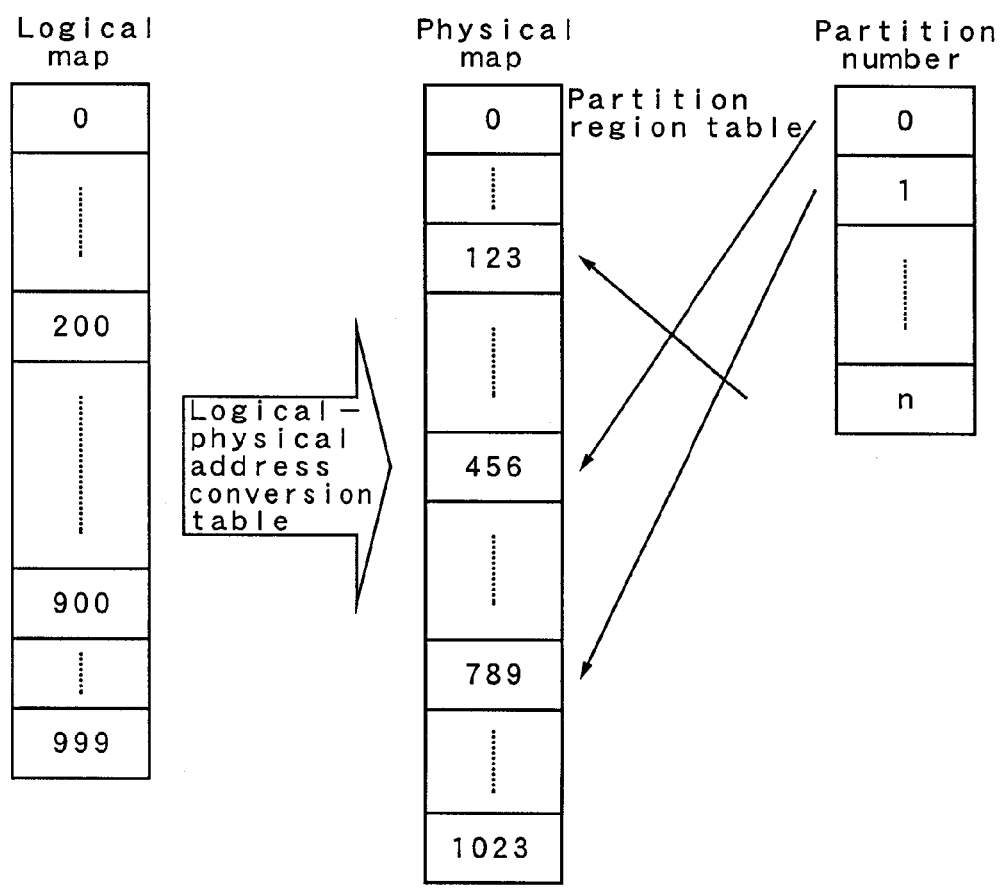

NONVOLATILE MEMORY DEVICE AND NONVOLATILE MEMORY SYSTEM WITH FAST BOOT CAPABILITY

TECHNICAL FIELD

The present invention relates to: a nonvolatile memory device using a nonvolatile memory such as a flash memory; and a nonvolatile memory system including the nonvolatile memory device and a host device for writing and reading data to and from the nonvolatile memory device.

BACKGROUND ART

In these years, a memory card as a nonvolatile memory device mounting a NAND-type flash memory that is a rewritable nonvolatile memory is increasingly expanding own market as a memory medium of a digital camera and a mobile phone. The expansion of memory card market means an expansion of market of a host device handling the memory card. Namely, this means increase of the host device having an interface for handling the memory card.

In a different view point, many host devices tend to shift a medium for storing a program code of a microcomputer mounted on the host devices from a ROM that is a conventionally-used non-rewritable nonvolatile memory to a rewritable nonvolatile memory to shorten cycles of a development and a commercialization of product. This is because when storing the program code in the rewritable nonvolatile memory, the host device can early accept an upgrade and a correction at an occurrence of trouble, advantageously.

However, a NAND type flash memory whose unit cost of bit is presently the least expensive among the rewritable nonvolatile memories requires new techniques, for example, an error correction technique and a wear-leveling that are not necessary for a conventionally-used ROM. The wear-leveling is a process for equalizing number of rewritings of inside blocks of the NAND type flash memory.

Thus, a method for utilizing an already-equipped interface for the memory card has been recently employed without additionally mounting a technique for controlling the NAND type flash memory on the host device. In this case, by using the already-equipped interface for the memory card, the memory card is equipped directly on the host device and a program code of a microcomputer mounted on the host device is stored into the directly-equipped memory card.

Referring to FIGS. 17 to 19, a nonvolatile memory system will be explained. FIG. 17 is a block diagram of the conventional nonvolatile memory system. In the nonvolatile memory system of FIG. 17, after power-on, a host device 1702 reads a program code (a boot code) for a process executed after the power-on from a nonvolatile memory device 1701 to boot up the system.

In FIG. 17, the nonvolatile memory device 1701 is a memory card where the host device 1702 can read and write data designated with a logical address. The nonvolatile memory device 1701 is composed of a controller 1703 and a flash memory 1704. The flash memory 1704 is a nonvolatile memory having a memory cell array for storing writing-data sent from the host device 1702 in a nonvolatile manner. The controller 1703 controls the whole of the inside of the nonvolatile memory device 1701, and has an interface for the host device 1702 and an interface for the flash memory 1704.

The controller 1703 includes a processor 1705, a host IF (interface) 1706, a flash memory IF (interface) 1707, a logical-physical address conversion table 1708, and a buffer memory 1709.

The processor 1705 controls the whole of the inside of the controller 1703. The host IF 1706 controls interfaces of: data to be written and read by the host device 1702; and commands regarding the writing and reading operations. The flash memory IF 1707 controls the data writing to the flash memory 1704 and the data reading from the flash memory 1704. The logical-physical address conversion table 1708 is a table showing a correspondence between addresses used for the data writing and reading in the interface of the nonvolatile memory device 1701 and host device 1702 (hereinafter referred to as a logical address) and addresses of the flash memory 1704 (hereinafter referred to as a physical address) in order to realize a function of the wear-leveling inside the nonvolatile memory device 1701. The buffer memory 1709 is a volatile memory for: temporarily retaining data before writing the data from the host device 1702 to be written to the flash memory 1704; and temporarily retaining data read from the flash memory 1704 before reading it out to the host device 1702.

The host device 1702 includes at least a processor 1711, a main memory 1712, and a nonvolatile memory device IF (interface) 1713. The processor 1711 controls the whole inside of the host device 1702. Additionally, the processor 1711 has a function for determining a logical address used for writing data to the nonvolatile memory device 1701 and reading data from the nonvolatile memory device 1701. The main memory 1712 is a volatile memory for storing a program code read from the nonvolatile memory device 1701 and other data. The nonvolatile memory device IF 1713 controls: data used for executing the data writing or reading to the nonvolatile memory device 1701; and an interface for ordering a writing and reading operation. The nonvolatile memory device IF 1713 designates a logical address to write and read data.

Referring to FIG. 18, an operation for reading data of the program code in the conventional nonvolatile memory system will be explained. FIG. 18 is a sequence diagram showing a sequence from the power-on to the boot code reading between the host device 1702 and the nonvolatile memory device 1701.

At first, when the host device 1702 applies a voltage to the nonvolatile memory device 1701, initialization of the controller 1703 and following initialization of the nonvolatile memory device are carried out. The processor 1705 executes the initialization of the controller 1703 (controller initialization). The controller initialization is a process for: resetting a register not shown in the drawings of each part of the controller; recognizing a type of the flash memory 1704 and the number of arrays; and recognizing information related to a size and a characteristic of the nonvolatile memory device 1701 by reading data stored in a specific region of the flash memory 1704. Time required for the controller initialization is short within a few microseconds. When the controller completes the initialization, the nonvolatile memory device 1701 is able to communicate with the host device 1702 each other.

At step 1801, the host device 1702 issues an initialization command to the nonvolatile memory device 1701 via the nonvolatile memory device IF 1713. The initialization command sent from the host device 1702 is a command for initializing the nonvolatile memory device 1701. The initialization of the nonvolatile memory device 1701 is a process where the processor 1705 in the controller reads management information from the flash memory 1704 via the flash memory IF 1707 and completes the logical-physical address conversion table 1708 on the basis of the read management information. Time required for completion of the initialization of the nonvolatile memory device 1701 is approximately a few hundreds microseconds in actual time. Upon completion of the initialization of the nonvolatile memory device 1701, the host device 1702 is able to designate a logical address to the nonvolatile memory device 1701 to write and read data.

Upon reception of the initialization command issued from the host device 1702 at step 1801, the nonvolatile memory device 1701 returns a response to the host device 1702 when the controller initialization has finished, and does not return the response when the controller initialization has not finished yet. When the response to the initialization command at step 1801 has not been returned from the nonvolatile memory device 1701 yet, the host device 1702 can recognize that the nonvolatile memory device 1701 has not finished the controller initialization yet.

In order to initialize the nonvolatile memory device 1701, the host device 1702 is required to issue the initialization command to the nonvolatile memory device 1701 until the response is returned from the nonvolatile memory device 1701. Here, the host device issues the initialization command again at step 1802. When the initialization of the controller 1703 in the nonvolatile memory device 1701 has finished in receiving the initialization command at step 1802, the processor 1705 returns a response to the initialization command via the host IF 1706 at step 1803.

When the response has been returned from the nonvolatile memory device 1701 at step 1803, the host device 1702 can recognize that the initialization of the controller 1703 in the nonvolatile memory device 1701 finished and the initialization of the nonvolatile memory device 1701 has started.

The host controller 1702 that recognized the completion of the controller initialization issues a initialization completion confirmation command at step 1804, and sends the command from the nonvolatile memory device IF 1713 to the nonvolatile memory device 1701. Meanwhile, when the initialization process of the nonvolatile memory device 1701 has not finished, the processor 1705 returns a response for notifying the initialization has not finished to the host device 1702 at step 1805. During a period up to the completion of the initialization process of the nonvolatile memory device 1701, the command issuance and the response at step 1804 and step 1805 are repeated more than once.

The nonvolatile memory device 1701 creates the logical-physical address conversion table 1708, spending time (T1) of a few hundreds microseconds, and when the initialization process has finished, returns a response for notifying the completion of the initialization at step 1807 in response to a initialization completion confirmation command at step 1806 from the host device 1702.

When receiving the response for notifying the completion of the initialization at step 1807 from the nonvolatile memory device 1701, the host device 1702 recognizes that data to which a logical address is designated can be written and read to and from the nonvolatile memory device 1701. Next, the host device 1702 designates a logical address at step 1808 to read a boot code. The nonvolatile memory device 1701 outputs the boot code to the host device 1702 at step 1809.

The host device 1702 can start the nonvolatile memory system by loading the boot code read at step 1809 on the main memory 1712.

FIG. 19 shows a flowchart of a process to the host device 1702 of the nonvolatile memory device 1701, the process corresponding to the sequence diagram of FIG. 18. States from the power-on to the completion of the controller initialization are not shown in the drawing because the states are only in internal processes of the nonvolatile memory device 1701. The initialization command at step 1801 is issued from the host device 1702 to the nonvolatile memory device 1701 before the initialization of the controller. Upon completion of the controller initialization in the nonvolatile memory device 1701 after the power-on, the memory device will be in a state at judgment 1901 for waiting a command inputted from the host device 1702. The nonvolatile memory device 1701 waits at judgment 1901 until the initialization command is inputted from the host device 1702. When the initialization command is issued to the nonvolatile memory device 1701 at step 1802, the memory device judges the command as the initialization command at judgment 1901 to shift to state 1902 and returns a response of step 1803 to the initialization command of step 1802 at state 1902. In response to the initialization command from the host device 1702, the nonvolatile memory device 1701 starts the initialization process in the nonvolatile memory device 1701. The starting of the initialization process in the nonvolatile memory device 1701 and the initialization process are not shown in the drawing.

Next, shifting to judgment 1903, the memory device judges whether the initialization completion confirmation command is issued or a command other than the command is issued. In the case of the command other than the initialization completion confirmation command, the memory device waits at judgment 1903 until the initialization completion confirmation command is issued from the host device 1702.

The host device 1702 issues the initialization completion confirmation command to the nonvolatile memory device 1701 at step 1804. In response to the issuance, the nonvolatile memory device 1701 shifts the flow to judgment 1904.

When the initialization of the nonvolatile memory device 1701 has not finished at judgment 1904, the flow shifts to state 1905. The memory device returns a response indicating incompletion of the initialization at step 1805 corresponding to step 1905, and the flow returns to judgment 1903. When receiving the response indicating the incompletion of the initialization from the nonvolatile memory device 1701, the host device 1702 recognizes that the nonvolatile memory device 1701 has not been ready for the reading and writing based on the designation of logical address yet.

When the initialization of the nonvolatile memory device 1701 has finished, the flow shifts from judgment 1904 to state 1906. Upon reception of the initialization completion command at step 1806, the memory device returns a response notifying the initialization completion at step 1807 corresponding to state 1906. When receiving the response notifying the initialization completion from the nonvolatile memory device 1701, the host device 1702 recognizes that the nonvolatile memory device 101A is ready for the reading and writing based on the designation of logical address. In the flowchart shown in FIG. 19, the initialization has entirely finished, and after the completion of the initialization, the host device 1702 issues a boot code reading command at step 1808 and reads a boot code at step 1809 to start the system.

Patent document 1: Japanese Unexamined Patent Publication No. S62-221034

DISCLOSURE OF THE INVENTION

Problems to be Solved by the Invention

However, a conventional nonvolatile memory system where a nonvolatile memory device of a memory card stores a boot program has a problem that demands longer time required for setting the memory device to be able to read data after power-on, namely, longer initialization time compared to that of a ROM. The initialization time is mainly required for creating a logical-physical address conversion table. When the initialization time is long, time until starting to read a boot code after the power-on of the host device is long, resulting in taking long time until the memory device starts-up.

Means to Solve the Problems

To solve the problem, a nonvolatile memory device of the present invention comprises: a controller; and a nonvolatile memory and stores data accessible from an external host device in said nonvolatile memory, the nonvolatile memory deice, wherein: said accessible data is divided into a plurality of partitions; a plurality of said partitions include at least one boot partition; and said controller prepares a first state where the boot partition can be accessed after power-on and a second state where an arbitrary partition of a plurality of said partitions can be accessed, and has means for when said controller changes from said first state to said second state, notifying the external host device whether or not said transition has finished.

The nonvolatile memory device may notify the external host whether or not said nonvolatile memory device is in said first state in response to issuance of a command from the external host device for requesting to access said boot partition.

The nonvolatile memory device may notify the external host whether or not said nonvolatile memory device is in said second state in response to issuance of a command from the external host device for requesting to access the partition other than said boot partition.

Said boot partition may be determined on the basis of a command preliminarily issued from the external host device to the nonvolatile memory device.

Said boot partition may store a boot code for the external host device.

Said controller may further include a boot code address conversion table for converting address information designated by the external host device into a physical address that is an address in said nonvolatile memory, and said controller may make said boot partition accessible by converting the address information designated by said external host device into a physical address of said nonvolatile memory by using said boot address conversion table in said first state.

Said controller may further include a logical-physical address conversion table for converting a logical address designated by an outside of the nonvolatile memory device into a physical address that is an address in said nonvolatile memory, and said controller may access said arbitrary partition by converting the logical address designated by said external host device into a physical address of said nonvolatile memory by using said logical-physical address conversion table in said second state.

Said boot code address information may be a number to specify the partition.

Said boot code address conversion part may convert the number to specify said partition into a physical address at which data of a first logical address of said corresponding partition.

To solve the problem, a nonvolatile memory system of the present invention comprises: a nonvolatile memory device; and a host device, wherein said nonvolatile memory device is any one of the above-mentioned nonvolatile memory devices.

To solve the problem, a nonvolatile memory device of the present invention comprises: a controller; and a nonvolatile memory, wherein said nonvolatile memory includes a memory cell array and stores data written and read from outside of the nonvolatile memory device in said memory cell array, and said controller includes: a logical-physical address conversion part for converting a logical address designated from the outside of the nonvolatile memory device into a physical address that is an address of said nonvolatile memory; a boot code address conversion part for converting boot code address information designated from the outside into a physical address of an address of said nonvolatile memory, and wherein data can be read and written by designating a logical address from the outside in a state where said logical-physical address conversion part can be used, and a region accessible by designating a logical address from the outside is set a first region and data can be read, after power-on, by designating the boot code address information to a predetermined part of region of said first region from the outside before said logical-physical address conversion part becomes ready to be used.

The logical address designated from the outside may be divided into a plurality of partitions.

Said boot record address information may be a number to specify said partition.

Said boot code address conversion part may convert the number to specify said partition into a corresponding physical address storing data of a first logical address of said partition.

Said boot code address conversion part may convert between said boot code address information and said physical address in a one-to-one function.

Said boot code address conversion part may include a reverse conversion function for converting said physical address into said boot code address information and may notify said boot code address information obtained by said reverse conversion function of the outside.

Said boot code address conversion part may convert a physical address converted from 0 of said logical address in said logical-physical address conversion part into the boot code address information.

In addition, to solve the problem, a nonvolatile memory system is composed of a nonvolatile memory device and a host device, wherein said nonvolatile memory device comprises: a controller; and a nonvolatile memory, said nonvolatile memory includes a memory cell array and stores data written and read from outside of the nonvolatile memory device in said memory cell array, and said controller includes: a logical-physical address conversion part for converting a logical address designated from the outside of the nonvolatile memory device into a physical address that is an address of said nonvolatile memory; a boot code address conversion part for converting boot code address information designated from the outside into a physical address of an address of said nonvolatile memory, and wherein data can be read and written by designating a logical address from the outside in a state where said logical-physical address conversion part can be used, and a region accessible by designating a logical address from the outside is set a first region and data can be read, after power-on, by designating the boot code address information to a predetermined part of region of said first region from the outside before said logical-physical address conversion part becomes ready to be used.

The logical address designated from the outside may be divided into a plurality of partitions.

Said boot record address information may be a number to specify said partition.

Said boot code address conversion part may convert the number to specify said partition into a corresponding physical address storing data of a first logical address of said partition.

Said boot code address conversion part may convert between said boot code address information and said physical address in a one-to-one function.

Said boot code address conversion part may include a reverse conversion function for converting said physical address into said boot code address information and may notify said boot code address information obtained by said reverse conversion function of the outside.

Said boot code address conversion part may convert a physical address converted from 0 of said logical address in said logical-physical address conversion part into the boot code address information.

Effectiveness of the Invention

According to the present invention, the host device is able to read data of program code that is a boot code from a nonvolatile memory device as early as possible after power-on by preparing a first state of allowing data-reading in a predetermined region included in a region where data-reading and data-writing can be executed in a second state before the nonvolatile memory device is in the second state of allowing data-reading and data-writing. Accordingly, a nonvolatile memory system can be started-up rapidly.

BRIEF DESCRIPTION OF DRAWINGS

FIG. 5 is a schematic diagram of an address conversion of the nonvolatile memory system according to the first embodiment of the present invention.

FIG. 12 is a view showing a partition region table of the nonvolatile memory system according to the fourth embodiment of the present invention.

FIG. 13 is a schematic diagram of an address conversion of the nonvolatile memory system according to the fourth embodiment of the present invention.

Figure 1:
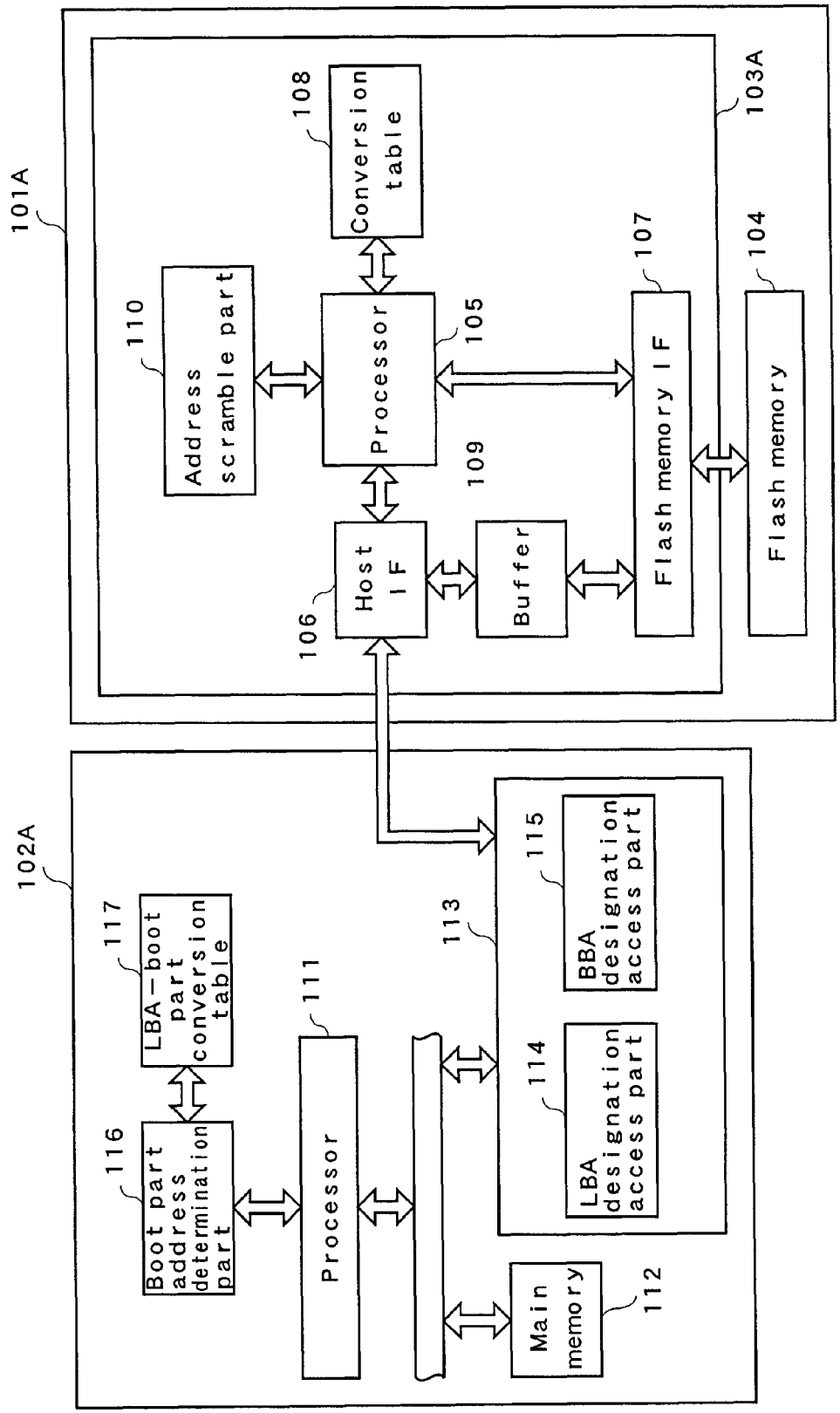
FIG. 1 is a view showing a configuration of a nonvolatile memory system according to a first embodiment of the present invention.

EXPLANATION FOR REFERENCE NUMERALS 101A, 101B, 101C Nonvolatile memory device
102A, 102B, 102C Host device
103A, 103B, 103C Controller
104 Flash memory
105 Processor
106 Host IF
107 Flash memory IF
108 Logical-physical address conversion table
109 Buffer memory
110 Address scramble part
111 Processor
112 Main memory
113 Nonvolatile memory device IF
114 LBA designation access part
115 BBA designation access part
116 Boot part address determination part
117 LBA-boot part conversion table
121 Partition management table
122 Mode determination part
123 Partition region table
124 PN designation access part
1701 Nonvolatile memory device
1702 Host device
1703 Controller
1704 Flash memory
1705 Processor
1706 Host IF
1707 Flash memory IF
1708 Logical-physical address conversion table
1709 Buffer memory
1711 Processor
1712 Main memory
1713 Nonvolatile memory device IF

BEST MODE FOR CARRYING OUT THE INVENTION

First Embodiment

Referring to attached drawings, a nonvolatile memory system according to a first embodiment of the present invention will be explained below.

FIG. 1 shows a configuration of a nonvolatile memory system according to the present embodiment. The nonvolatile memory system starts up when a host device 102A reads after power-on a program code (a boot code) used for a process after the power-on from a nonvolatile memory device 101A.

1. Configuration of Nonvolatile Memory Device

In FIG. 1, the nonvolatile memory device 101A is a memory card in which data can be written and read by the host device 102A that designates the data by using a logical address. In addition, the nonvolatile memory device 101A is also able to read data on the basis of a boot block address designated by the host device 102A to not all of address regions able to be designated by the logical addresses but a part of the regions. The boot block address will be described in detail below. The nonvolatile memory device 101A has a controller 103A and a flash memory 104. The flash memory 104 is a nonvolatile memory including a memory cell array for storing writing data from the host device 102A in a nonvolatile manner. The controller 103A controls whole of the inside of the nonvolatile memory device 101A, and has an interface to the host device 102A and an interface to the flash memory 104.

The controller 103A includes a processor 105, a host IF (interface) 106, a flash memory IF (interface) 107, a logical-physical address conversion table 108, a buffer memory 109, and an address scramble part 110.

The processor 105 controls whole of the inside of the controller 103A. The host IF 106 controls interfaces of: data written by the host device 102A or read from the host device 102A; and a command related to an operation designation of the writing or reading. The flash memory IF 107 controls the data-writing to the flash memory 104 and the data-reading from the flash memory 104. The logical-physical address conversion table 108 is a table used for converting a logical address designated by the host device 102A into a physical address that is an address in the flash memory 104. The buffer memory 109 is a volatile memory for temporarily retaining writing-data before the writing-data from the host device 102A is written to the flash memory 104 and for temporarily retaining reading-data after the reading-data to the host device 102A has been read from the flash memory 104. The address scramble part 110 is a boot block address conversion table having a function for converting a physical address into the boot block address on the basis of a predetermined one-to-one function (a function having an inverse function) and a function for converting the boot block address into the physical address on the basis of the inverse function of the predetermined one-to-one function. The boot block address is address information including a boot code. The address scramble part 110 converts the boot block address into a physical address of the flash memory 104 when the host device 102A reads data by designating the boot block address or converts the physical address of the flash memory 104 into the boot block address in order to notify the host device 102A of the boot block address.

Here, the logical-physical address conversion table 108 relates a logical address designated by an outside of the nonvolatile memory device 101A to a physical address of the flash memory 104, however, the conversion between a logical address and a physical address may employ, for example, a technique disclosed in WO2005/022393 or WO2005/106673.

2. Configuration of Host Device

The host device 102A includes at least a processor 111, a main memory 112, a nonvolatile memory device IF (interface) 113, a boot part address determination part 116, and a LBA-boot part conversion table 117. Other than the above-mentioned components, various types of user interface parts such as: a keyboard and a pointing device used for inputting data from a user; and a liquid crystal display and a speaker used for outputting data to the user (all of them are not shown in the drawing) are included. The processor 111 controls whole of the inside of the host device 102A. Additionally, the processor 111 has a function for determining a logical address used for writing or reading data required for the controlling to or from the nonvolatile memory device 101A. The main memory 112 is a volatile memory for storing a program code read from the nonvolatile memory device 101A and the like. The nonvolatile memory device IF 113 has an LBA designation access part 114 and a BBA designation access part 115, and controls: data to be read or written from or to the nonvolatile memory device 101A; and an interface for commanding the reading or writing operation. The LBA designation access part 114 of the nonvolatile memory device IF 113 is used when data to which a logical block address (LBA) is designated is written or read, and the BBA designation access part 115 is used in reading data to which the boot block address (BBA) is designated. The boot part address determination part 116 has a function for converting a logical address determined by the processor 111 into the boot block address. On this occasion, the boot part address determination part 116 uses the LBA-boot part conversion table 117. The LBA-boot part conversion table 117 is a table for showing a correspondence relationship of the boot block address to a logical address of the boot code of the host device 102A, the boot code being written in the nonvolatile memory device 101A, and is composed of nonvolatile memory elements.

Figure 2:
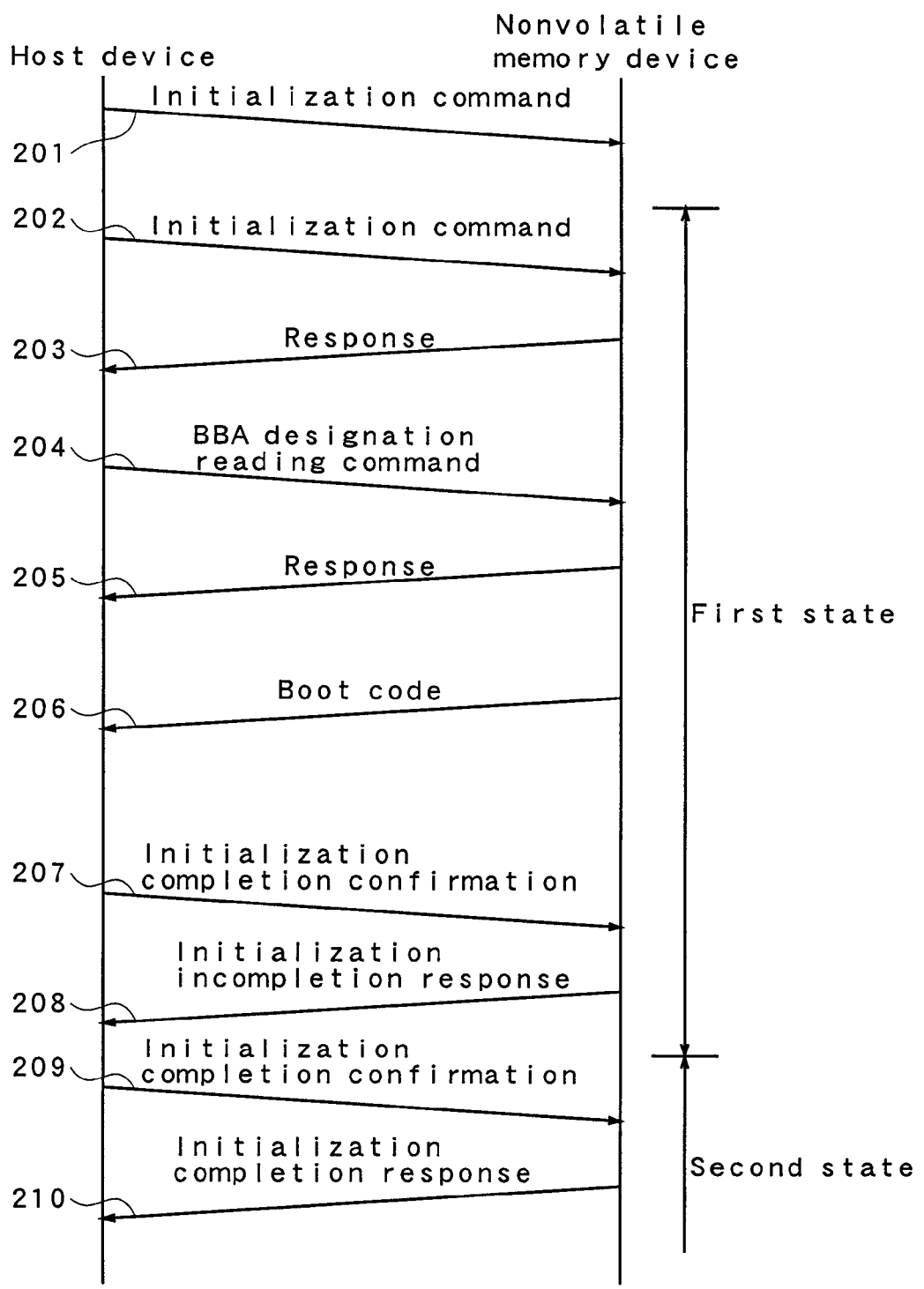
FIG. 2 is a sequence diagram of boot code reading of the nonvolatile memory system according to the first embodiment of the present invention.

Referring to FIG. 2, the reading of data of the program code in the nonvolatile memory system according to the present embodiment will be explained. FIG. 2 is a sequence diagram in the initialization between the host device 102A and the nonvolatile memory device 101A after the power-on.

At first, when the host device 102A applies a voltage to the nonvolatile memory device 101A, the processor 105 initializes the controller 103A (controller initialization). The controller initialization is a process for: resetting a register not shown in the drawings of each part of the controller; recognizing a type of the flash memory 104 and the number of the arrays; and recognizing information related to a size and a characteristic of the nonvolatile memory device 101 by reading data stored in a specific region of the flash memory 104. Time required for the controller initialization is short within a few microseconds. Upon completion of the controller initialization, the nonvolatile memory device 101A is able to mutually communicate with the host device 102A. A state after completion of the initialization of the controller 103A is a first state of the nonvolatile memory device 101A.

In the first state, data can be read from a specific region of the flash memory 104.

Meanwhile, the host device 102A issues an initialization command to the nonvolatile memory device 101A via the nonvolatile memory device IF 113 at step 201. The initialization command sent from the host device 102A is a command for initializing the nonvolatile memory device 101A. The initialization of the nonvolatile memory device 101A is a process where the processor 105 in the controller reads management information from the flash memory 104 via the flash memory IF 107 and completes the logical-physical address conversion table 108 on the basis of the read management information. Time required for completion of the initialization of the nonvolatile memory device 101A is approximately a few hundreds microseconds in actual time. Upon completion of the initialization of the nonvolatile memory device 101A, the host device 102A is able to designate a logical address to the nonvolatile memory device 101A to write and read data. A state after completion of the initialization of the nonvolatile memory device 101A is a second state of the nonvolatile memory device 101A.

Upon reception of the initialization command issued from the host device 102A at step 201, the nonvolatile memory device 101A returns a response to the host device 102A when being in the first state, and does not return the response when not still being in the first state. When the nonvolatile memory device 101A does not return the response to the initialization command, the host device 102A can recognize that the nonvolatile memory device 101A is not still in the first state, namely, that the initialization of the controller 103A has not finished.

In order to initialize the nonvolatile memory device 101A, the host device 102A needs to issue the initialization command to the nonvolatile memory device 101A until the response is returned from the nonvolatile memory device 101A. The host device 102A issues the initialization command again at step 202. When the initialization of the controller 103A has finished in receiving the initialization command at step 202 and the memory device is in the first state, the processor 105 returns a response to the initialization command via the host IF 106 at step 203. Upon receiving the initialization command from the host device 1702, the nonvolatile memory device 101A starts the initialization process in the nonvolatile memory device 101A.

When the response is returned from the nonvolatile memory device 101A at step 203, the host device 102A can recognizes that the initialization of the controller 103A in the nonvolatile memory device 101A ended and the nonvolatile memory device 101A has been in the first state.

Since the processor 105 has recognized a type and the number of the connected flash memory 104 in the first state, data can be read from the flash memory 104 via the flash memory IF if a physical address of the flash memory 104 for reading is determined.

The host device 102A that recognized the nonvolatile memory device 101A is in the first state designates the boot block address to read the boot code and issues a command for reading data at step 204. For this purpose, the processor 111 of the host device 102A determines a logical address corresponding to data of the boot code written in the nonvolatile memory device 101A (hereinafter referred to as a boot part logical address). The processor 111 sends the boot part logical address to the boot part address determination part 116. The boot part address determination part 116 converts the boot part logical address that is a logical address sent from the processor 111 into the boot block address by using the LBA-boot part conversion table 117. Hereinafter, the boot block address corresponding to the boot part logical address is referred to as the boot part boot block address. The processor 111 sends the boot part boot block address obtained from the boot part address determination part 116 to the nonvolatile memory device IF 113. The BBA designation access part 115 designates the boot block address to the nonvolatile memory device 101A by using the boot part boot block address given from the processor 111, and issues a reading command to the nonvolatile memory device 101A. The boot block address can be converted into a physical address of the flash memory 104 in the controller 103A. At the timing of step 204, the initialization process does not necessarily have to finish in the nonvolatile memory device 101A.

Upon reception of the command for reading the boot code at step 204, the processor 105 of the nonvolatile memory device 101A firstly returns a response to the host device 102A at step 205. Then, the creation of the logical-physical address conversion table 108 that is the initialization process of the nonvolatile memory device 101A is interrupted once, and the boot part boot block address designated by the reading command at step 204 is sent to the address scramble part 110. The address scramble part 110 converts the boot part boot block address into a corresponding physical address of the flash memory 104 (hereinafter referred to as a boot part physical address). The processor 105 designates the boot part physical address, reads the boot code from the flash memory 104 via the flash memory IF 107, temporarily retains the boot code in the buffer memory 109, and then outputs the boot code to the host device 102A at step 206.

The processor 111 of the host device 102A transfers the boot code read at step 206 to the main memory 112 via the nonvolatile memory device IF 113. The processor 111 starts-up the host device 102A by using the boot code transferred to the main memory 112.

According to the above-mentioned boot code reading sequence, when the memory device is in the first state where the initialization of the controller 103A has finished after the power-on, the host device 102A can read the boot code from the nonvolatile memory device 101A even in the case where the memory device is not still in the second state. This is because the host device 102A becomes able to read data from the flash memory 104 without waiting for completion of the creation of the logical-physical address conversion table 108 in the nonvolatile memory device 101A when designating the boot block address that is information able to be directly related to a physical address corresponding to a logical address in which the boot code is written and issuing a reading command to the nonvolatile memory device 101A. The directly-relating of the boot block address to the physical address in the address scramble part 110 will be described below.

Meanwhile, the processor 105 of the nonvolatile memory device 101A resumes the interrupted initialization after outputting the boot code to the host device 102A.

After this, the host device 102A issues a command for confirming the initialization completion from the nonvolatile memory device IF 113 at step 207. When the initialization process of the nonvolatile memory device 101A has not finished and the memory device is in the first state, the memory device returns a response notifying incompletion of the initialization to the host device 102A at step 208.

When the response returned at step 208 is a notification of incompletion of the initialization, the host device 102A issues the initialization completion confirmation command again at step 209. When being in the second state after the completion of the initialization process, the nonvolatile memory device 101A returns a response notifying the initialization completion to the initialization completion confirmation command from the host device 102A at step 210. The host device 102A recognizes due to the response of the initialization completion that the data-writing and data-reading based on a designated logical address has been permitted.

Figure 3:
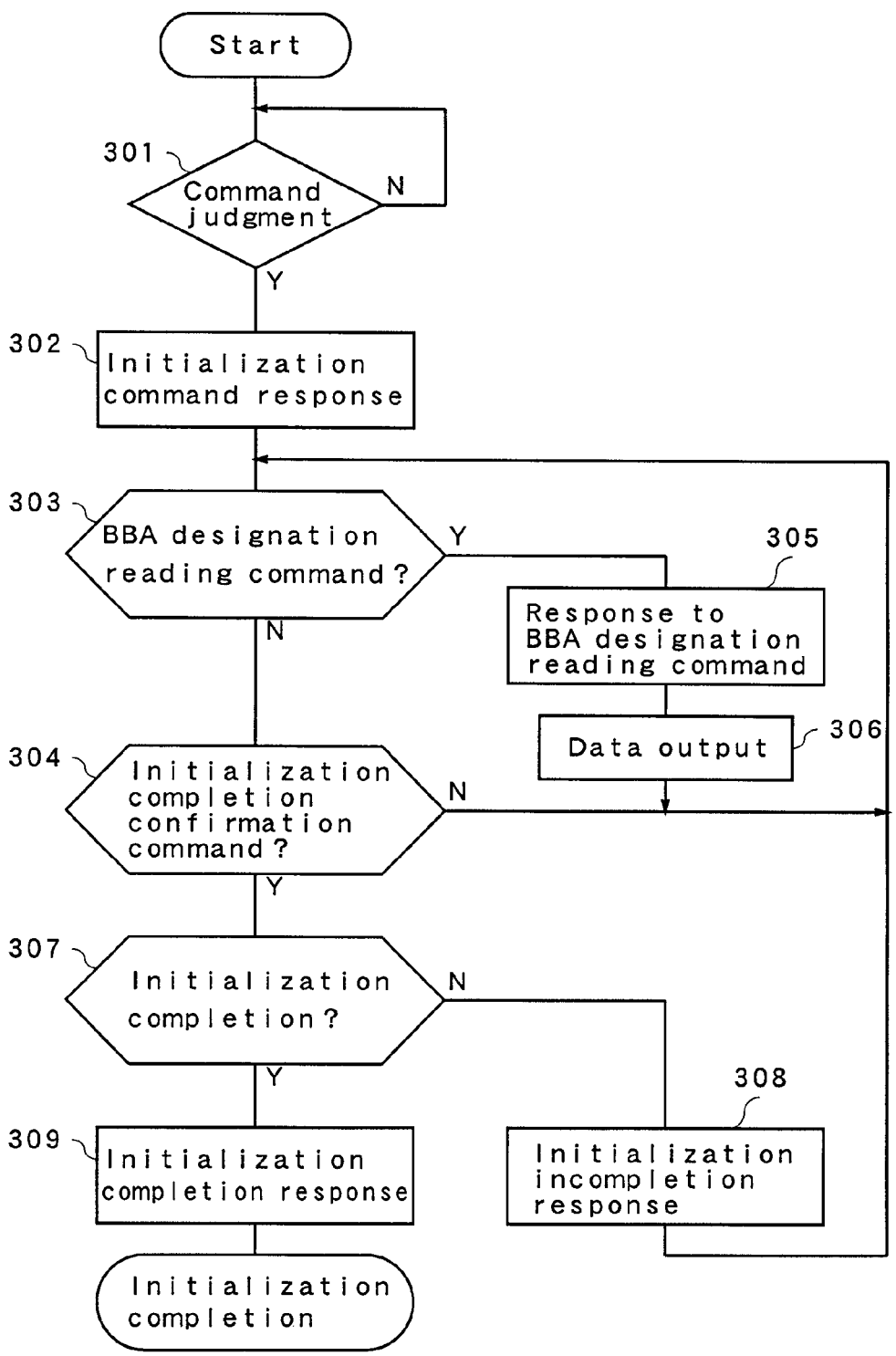
FIG. 3 is a flowchart in a nonvolatile memory device of the nonvolatile memory system according to the first embodiment of the present invention.

FIG. 3 shows a flowchart of a process to the host device 102A in the nonvolatile memory device 101A, the flowchart corresponding to the sequence diagram of FIG. 2. The initialization command at step 201 is issued from the host device 102A to the nonvolatile memory device 101A before the initialization of the controller 103. Since included only in the process in the nonvolatile memory device 101, a state from the power-on to completion of the initialization of the controller 103A is not shown in the drawings. Upon completion of the initialization of the controller 103A in the nonvolatile memory device 101 after the power-on, the memory device is in the first state and waits for a command input from the host device 102A at judgment 301. The nonvolatile memory device 101A waits at judgment 301 until the initialization command is inputted from the host device 102A. When the initialization command is issued to the nonvolatile memory device 101A at step 202, the memory device judges the command as the initialization command at judgment 301 to shift to state 302, and returns a response (step 203) to the initialization command at state 302. In addition, the nonvolatile memory device 101A starts the initialization process in the nonvolatile memory device 101A in response to the initialization command from the host device 102A. The starting of the initialization process and the initialization process itself in the nonvolatile memory device 101A are not shown in the drawings.

Next, the flow transits to judgments 303 and 304 to judge whether a command is a reading command to designate the boot block address, the initialization completion confirmation command, or a command other than them. When the memory device judges the command as the reading command to designate the boot block address at judgment 303, the flow shifts to state 305. When the memory device judges the command as the initialization completion confirmation command at judgment 304, the flow shifts to judgment 307. In the case of the command other than them, the memory device waits for the issuance of the reading command to designate the boot block address (BBA) or the initialization completion confirmation command.

Here, the case where the host device 102A issues the reading command to designate the boot block address at step 204 in order to read the boot code early, namely, the case where the flow shifts from judgment 303 to state 305 will be described. The processor 105 recognizes that the command inputted via the host IF 106 is the reading command to designate the boot block address, returns a response (step 205), and interrupts the initialization process in the nonvolatile memory device 101A started from state 302. Then, the address scramble part 110 converts the designated boot block address into a physical address of the flash memory 104. The processor 105 reads the boot code from the flash memory 104 by designating the physical address to the flash memory IF 107, and sends the boot code to the buffer memory 109. And, the processor resumes the interrupted initialization process in the nonvolatile memory device 101A and the flow shifts to state 306.

State 306 corresponds to step 206, and the nonvolatile memory device 101A transfers the boot code stored in the buffer memory 109 to the host device 102A via the host IF 106. When executing the reading command to designate the boot block address in this manner, the host device 102A can read the boot code even in the case where the initialization in the nonvolatile memory device 101A has not finished. The processor 111 of the host device 102A loads the read boot code to the main memory 112 to start-up the host device 102A. Upon completion of state 306, the nonvolatile memory device 101A returns to judgments 303 and 304.

After the reading of the boot code, the host device 102A issues the initialization completion confirmation command to the nonvolatile memory device 101A at step 207. In response to the command, the nonvolatile memory device 101A shifts to judgment 307.

When being in the first state, the nonvolatile memory device 101A determines at judgment 307 that the initialization has not finished, and shifts to state 308. The memory device returns a response indicating incompletion of the initialization at step 208 corresponding to state 308, and returns to judgment 303. When receiving the response indicating incompletion of the initialization from the nonvolatile memory device 101A, the host device 102A recognizes that the nonvolatile memory device 101A is not still in the second state, namely, that the reading and writing based on the designation of logical address cannot be executed.

When being in the second state after completion of the initialization of the nonvolatile memory device 101A, the memory device shifts from judgment 307 to state 309 to return a response notifying completion of the initialization at step 210 in response to the initialization completion command at step 209. Since having received the response of the initialization completion from the nonvolatile memory device 101A, the host device 102A recognizes that the nonvolatile memory device 101A is already in the second state and that the data-reading and data-writing based on the designation of logical address cannot be executed.

Thus, the host device 102A may be required to issue the initialization completion confirmation commands more than once to confirm the initialization completion of the nonvolatile memory device 101A. The nonvolatile memory device 101A does not notify the host device 102A of the initialization completion until the initialization process including the creation of the logical-physical address conversion table 108 ends. Accordingly, the host device 102A needs to wait for completion of the initialization of the nonvolatile memory device 101A in order to read data by designating a logical address to the nonvolatile memory device 101A, and accordingly spends much time to start the reading. On the other hand, in the case of the reading based on the boot block address designation, the host device 102A can read data without waiting for the initialization completion of the nonvolatile memory device 101A.

The host device 102A reads the boot code from the nonvolatile memory device 101A after supplying the power to the nonvolatile memory device 101A, and the boot code is a data that is preliminarily written to the nonvolatile memory device 101A by the host device 102A or another host device other than the host device 102A. Here, a process in which the host device 102A writes the boot code to the nonvolatile memory device 101A will be explained.

Figure 4:
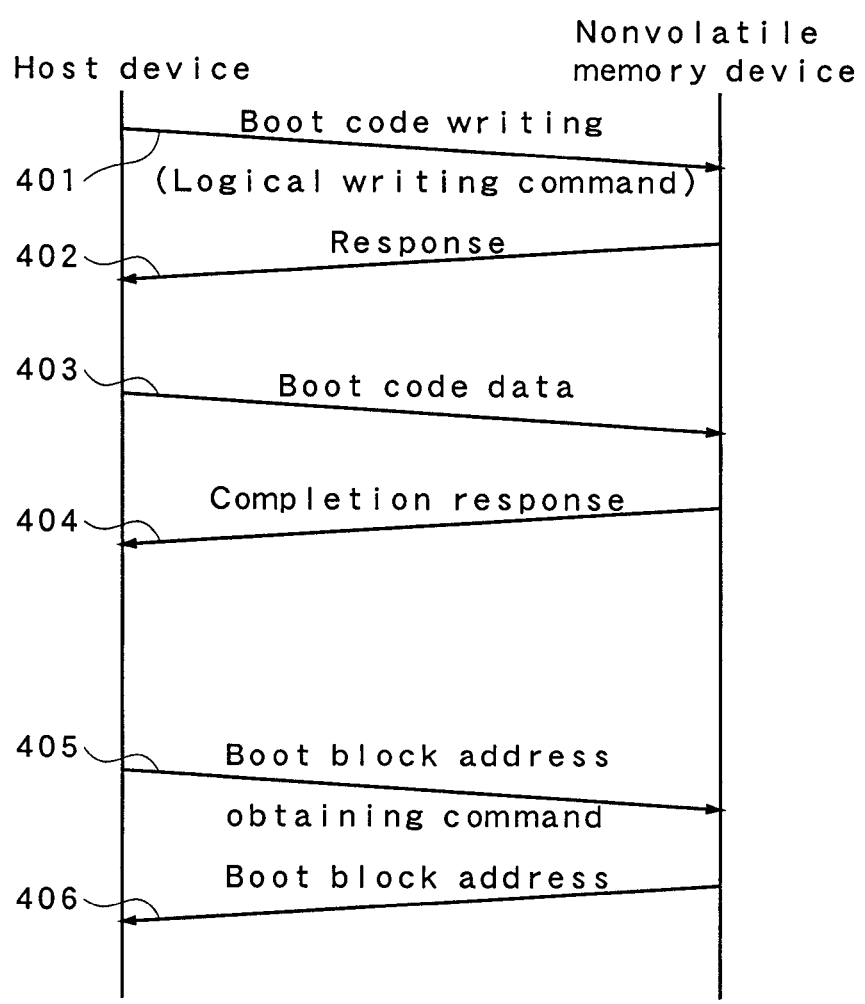
FIG. 4 is a sequence diagram of boot code address notification of the nonvolatile memory system according to the first embodiment of the present invention.

FIG. 4 is a sequence diagram of the boot code writing and a boot block address notification. This corresponds to a preparation the above-mentioned reading based on the boot block address designation. The boot block address notification is a process in which the nonvolatile memory device 101A converts a physical address that stores data of the boot code into the boot block address that is information able to be directly related to the physical address and notifies the host device 102A of the boot block address.

At step 401, the processor 111 of the host device 102A firstly issues a writing command that designates a logical address to the nonvolatile memory device 101A via the LBA designation access part 114 of the nonvolatile memory device IF 113. The nonvolatile memory device 101A returns a response notifying that the writing command has been recognized at step 402 to the host device 102A. Next, the host device sends the data of boot code corresponding to the writing command at step 401 to the nonvolatile memory device 101A. In the nonvolatile memory device 101A, the data of boot code sent from the host IF 106 at step 403 is retained in the buffer memory 109, and the data is further written to the flash memory 104 via the flash memory IF 107. The processor 105 updates information of the logical-physical address conversion table 108 in the data-writing to the nonvolatile memory device 101A, and writes its copy to the flash memory 104 as backup data, and a detailed description thereof will be omitted.

When the writing of the boot code to the flash memory 104 finishes, the processor 105 notifies the host device 102A of the finishing at step 404.

When the writing of data of the boot code to the flash memory 104 finishes, the host device 102A issues a boot block address obtaining command (BBA obtaining command) at step 405 to acquire the boot block address directly related to the physical address of the flash memory 104 to which the sent boot code has been written. When receiving the BBA obtaining command, based on the logical address at which data has been written just before (here, the logical address designated by the host device 102A at step 401), the processor 105 obtains the corresponding physical address from the logical-physical address conversion table 108. Based on the obtained physical address, the processor 105 further obtains the corresponding boot block address from the address scramble part 110.

Then, the processor 105 outputs the boot block address to the host device 102A via the host IF 106 at step 406. In the host device 102A, the LBA-boot part conversion table 117 that is a nonvolatile memory stores a correspondence relationship between the boot block address obtained from the nonvolatile memory device 101A and the logical address designated at step 401.

In this manner, the host device 102A can obtain the boot block address corresponding to the logical address at which data of the boot code is written and memorizes the address. At step 204 of FIG. 2, the boot block address memorized in the sequence is used.

FIG. 5 is a schematic view of the address conversion. In FIG. 5, a logical map on the left side shows a range of logical block address of the nonvolatile memory device 101A that the LBA designation access part 114 of the host device 102A can access. A boot block address on the right side is the boot block address to the nonvolatile memory device 101A that is stored in the LBA-boot part conversion table 117 of the host device 102A and can be accessed by the BBA designation access part 115. Only the number of addresses that can be stored in the LBA-boot part conversion table 117 of the host device 102A is accepted as the number of the boot block addresses. The central physical map is a map of physical block addresses of the flash memory 104 of the nonvolatile memory device 101A.

In FIG. 5, the left-side logical map and the central physical map are related each other with the logical-physical address conversion table 108. In this relation, since a size of the logical map is smaller than a size of the physical map, physical addresses that are not related in the logical-physical address conversion table 108 exist.
For example, this is a physical address of a physical block in which data has already been erased. The address scramble part 110 converts the right-side boot block address into a physical address.

As described above, as the access to data in the nonvolatile memory device 101A, there are two types of accesses; an access using the LBA designation access part 114 and an access using the BBA designation access part 115 able to access only a part of region that the LBA designation access part 114 can access (the storage size in the LBA-boot part conversion table 117).

Meanwhile, in the access from the BBA designation access part 115, although data can be read from the nonvolatile memory device 101A, data cannot be written due to the following reasons.
(1) An erased physical address cannot be found among all physical blocks of the flash memory 101 that has not been initialized in the nonvolatile memory device 101A.
(2) Though the data-writing requires update of the logical-physical address conversion table 108, the update cannot be executed in a state where the conversion table has not finished.

As described above, in the nonvolatile memory system of the present embodiment, since the first state where data can be read from a part of region where the data-reading and the data-writing can be executed in the second state is prepared before the second state where the data-reading and the data-writing can be executed, the host device 102A can read the program code from the nonvolatile memory device 101A earlier after the power-on. In this manner, the nonvolatile memory system can be started up rapidly.

Second Embodiment

A nonvolatile memory system according to a second embodiment of the present invention will be explained. Since a configuration of the nonvolatile memory system in the second embodiment is the same as that of FIG. 1, an explanation thereof will be omitted. In addition, since a method for reading data of a program code is the same as that shown in FIG. 2 and FIG. 3, an explanation thereof will be omitted. A schematic diagram of an address conversion is the same as that of the first embodiment, and an explanation thereof will be accordingly omitted.

Figure 6:
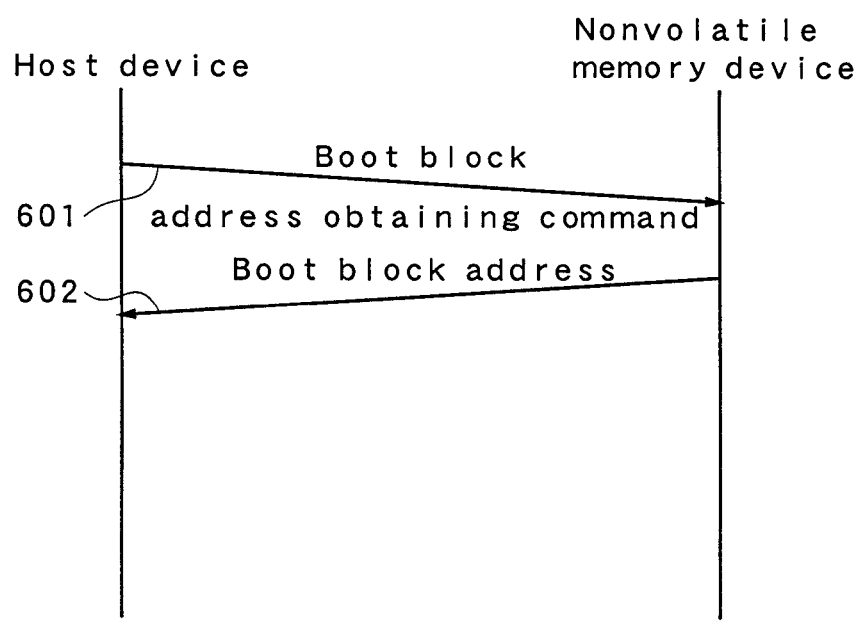
FIG. 6 is a sequence diagram of boot code address notification of a nonvolatile memory system according to a second embodiment of the present invention.

In the second embodiment, a sequence of the boot block address notification that is a preparation for the data-reading based on the boot block address designation is different from that in the first embodiment. FIG. 6 shows a sequence diagram of the boot block address notification.

The host device 102A reads the boot code from the nonvolatile memory device 101A after supplying the power to the nonvolatile memory device 101A, and the boot code is a data that is preliminarily written to the nonvolatile memory device 101A by the host device 102A or another host device other than the host device 102A. Here, an address processing of the boot block read by the host device 102A in a state where the boot code is written in the nonvolatile memory device 101A will be explained.

Similar to the first embodiment, in order to speed up the initialization process, the processor needs to obtain the boot block address directly related to a physical address of the flash memory 104 at which the boot code is written. At step 601, the processor firstly designate a logical block address and issues the boot block address obtaining command (BBA obtaining command). The processor 105 that received the BBA obtaining command via the host IF 106 obtains the corresponding physical address from the logical-physical address conversion table 108 on the basis of the designated logical address (here, the logical address designated to the host device 102A at step 601). The processor 105 further obtains the boot block address corresponding to the obtained physical address from the address scramble part 110.

Then, the processor 105 outputs the boot block address to the host device 102A via the host IF 106 at step 602. The host device 102A stores a correspondence relationship between the boot block address obtained from the nonvolatile memory device 101A and the logical address designated at step 601 in a nonvolatile memory of the LBA-boot part conversion table 117. In this manner, the host device 102A can obtain the boot block address corresponding to the logical address at which data of the boot code is written and memorize the address.

As described above, in the nonvolatile memory system of the present embodiment, since the first state where data can be read from a part of region where the data-reading and the data-writing can be executed in the second state is prepared before the second state where the data-reading and the data-writing can be executed, the host device 102A can read the program code from the nonvolatile memory device 101A earlier after the power-on. In this manner, the nonvolatile memory system can be started up rapidly.

Meanwhile, the boot code is often arranged at logical address 0 that is a first logical address generally. Thus, the host device 102A is sufficiently useful also in a case where information of the boot block address obtained from the nonvolatile memory device 101A is fixed to logical address 0. Accordingly, when the boot block address obtaining command designating a logical address in FIG. 6 is replaced by a command that cannot designate a logical address and can necessary obtain the boot block address corresponding to logical address 0, the configuration of the system such as the command definition can be simplified without substantially spoiling the effect of the present embodiment.

Third Embodiment

Figure 7:
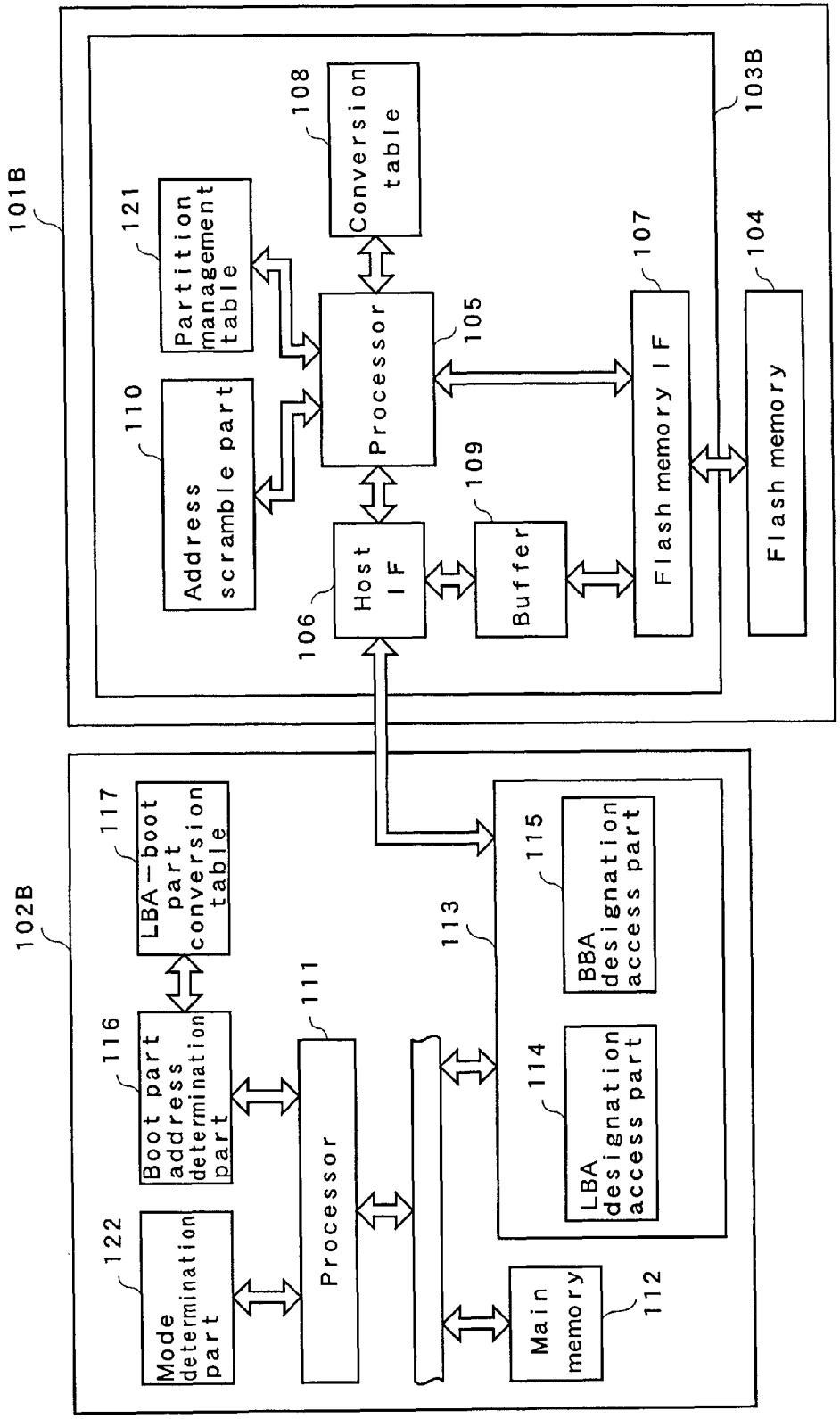
FIG. 7 is a view showing a configuration of a nonvolatile memory system according to a third embodiment of the present invention.

A nonvolatile memory system according to a third embodiment of the present invention will be explained. FIG. 7 shows a configuration of the nonvolatile memory system according to the present embodiment. Meanwhile, in FIG. 7, the same functional blocks as those of the nonvolatile memory system shown in FIG. 1 are given the same numerals and the explanations thereof will be omitted. In the third embodiment, the host device 102B corresponds to the nonvolatile memory system able to use a nonvolatile memory device 101B by dividing the memory device into a plurality of partitions.

In FIG. 7, a partition management table 121 is additionally included in a controller 103B of the nonvolatile memory device 101B in addition to the respective blocks of the controller 103A.

The partition management table 121 is a table for managing a correspondence relationship between logical addresses and partitions.

In FIG. 7, a mode determination part 122 is additionally included in the host device 102B compared to the host device 102A. The mode determination part 122 determines a mode to be set on the basis of an input signal from the user interface part or a peripheral device configuration confirmation part each included in the host device 102B and not shown in the drawings.

The user interface part has a function for a selection input using, for example, a switch provided outside or a GUI. For example, when a user using the nonvolatile memory system requests a start-up in a diagnosis mode different from the usually-executed start-up of the host device 102B, the mode determination part 122 notifies the processor 111 that the host device is started-up in the diagnosis mode. Additionally, in a case where information showing a configuration of peripheral device attached to the host device 102B, for example, is different from that in the previous start-up is inputted via the peripheral device configuration confirmation part, the mode determination part 122 notifies the processor 111 that the host device operates in a peripheral device confirmation mode.

The nonvolatile memory device 101B of the nonvolatile memory system includes a boot partition storing the boot program for the usually-executed starting-up of the host device 102B, a plurality of boot partitions each storing a boot program for, for example, the diagnosis mode or the peripheral device confirmation mode, and another partition.

Figure 8:
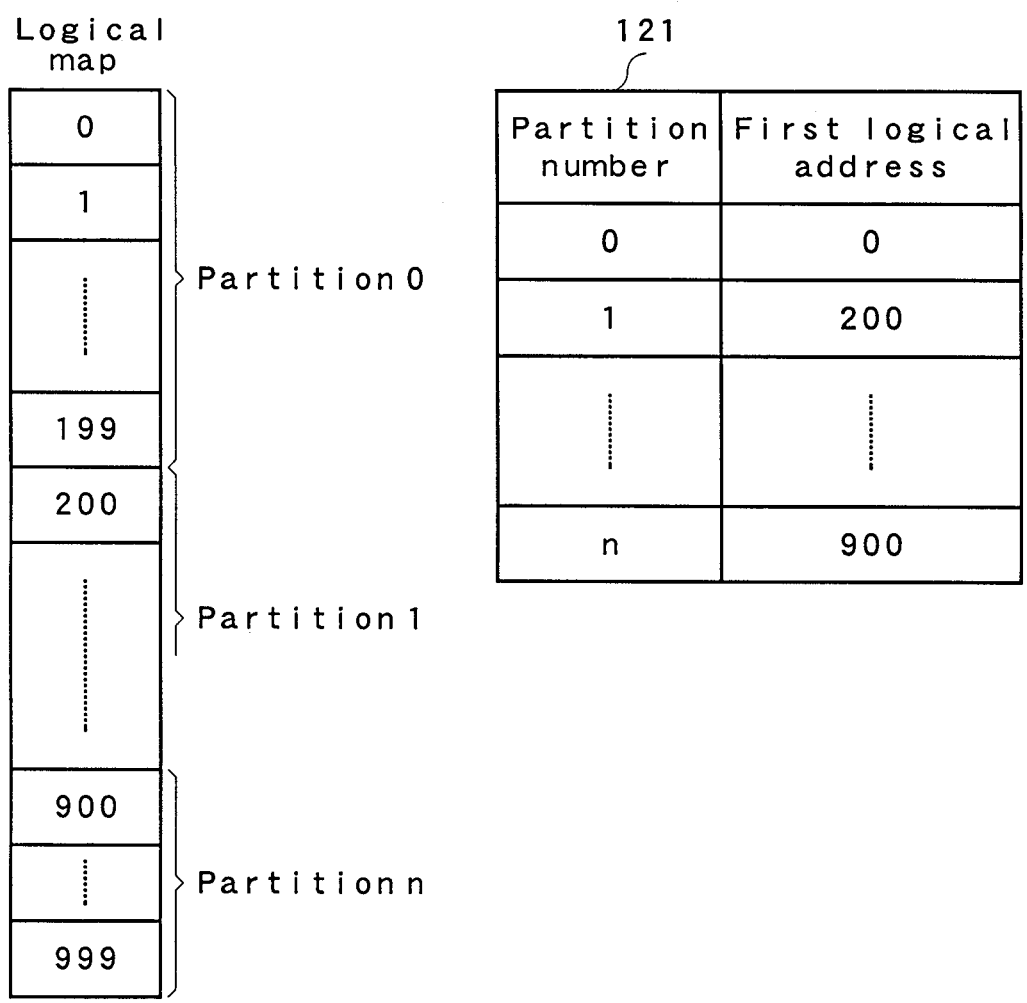
FIG. 8 is a view showing a configuration of a partition management table of the nonvolatile memory system according to the third embodiment of the present invention.

The partition management table 121 shows numbers of first logical addresses with respect to each partition number. FIG. 8 shows the partition management table 121 corresponding to a relationship between a logical map and the partition of the nonvolatile memory device 101B. As shown in the logical map, corresponding to addresses from logical address 0 to logical address 999 registered in the logical-physical address conversion table 108, logical addresses 0 to 199 correspond to partition 0, addresses from logical address 200 correspond to partition 1, and logical addresses 900 to 999 correspond to partition n. The partition management table 121 registers first logical address 0 to partition number 0, first logical address 200 to partition number 1, and first logical address 900 to partition number n, respectively. The processor 105 can recognize on the basis of the logical-physical address conversion table 108 and the partition management table 121 how a plurality of the respective partitions included in the nonvolatile memory device 101B are configured.

Figure 9:
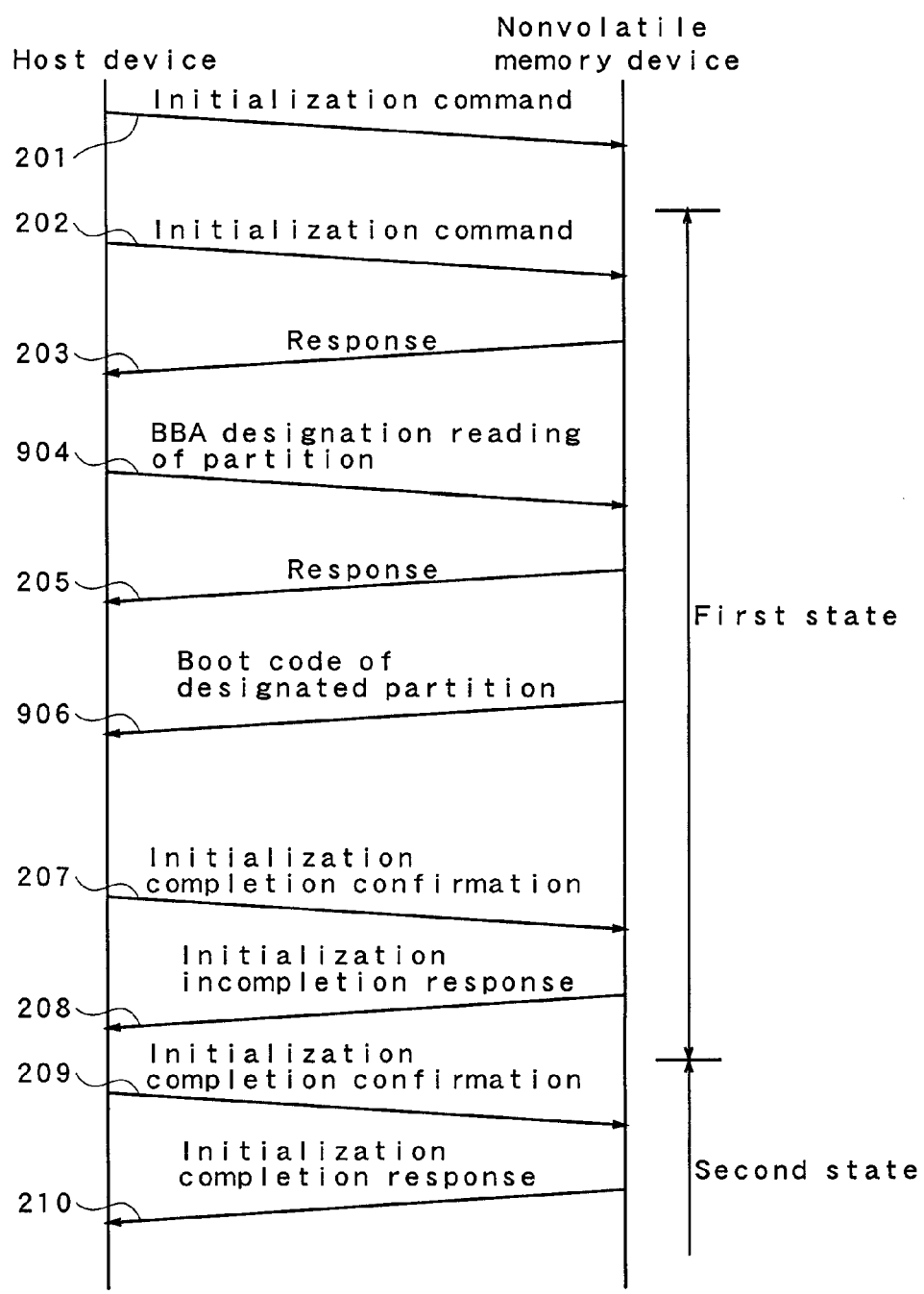
FIG. 9 is a sequence diagram of boot code reading of the nonvolatile memory system according to the third embodiment of the present invention.

Referring to FIG. 9, the reading of data of the program code in the nonvolatile memory system according to the present embodiment will be explained. FIG. 9 is a sequence diagram in an initialization between the host device 102B and the nonvolatile memory device 101B after the power-on, and the same sequences as those of FIG. 2 given the same numerals as those of FIG. 2 in FIG. 9. Here, the initialization command is a command for requiring an access to the boot partition.

Figure 10:
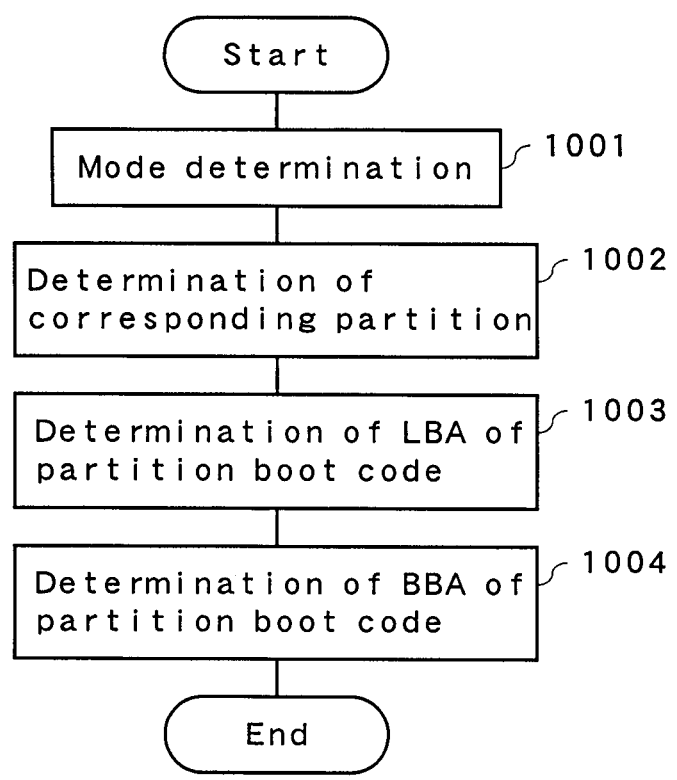
FIG. 10 is a flowchart in a host device of the nonvolatile memory system according to the third embodiment of the present invention.

In FIG. 9, in order to initialize the nonvolatile memory device 101B, the host device 102B issues the initialization command to the nonvolatile memory device 101B until a response is returned from the nonvolatile memory device 101B (steps 201 and 202). The reading from the nonvolatile memory device 101B after the host device 102B issued the initialization command is different from the operation shown in FIG. 2. Referring to FIG. 10, a process of the host device 102B in the case where the nonvolatile memory device 101B returns the response to the host device 102B at step 203 will be explained.

FIG. 10 is a flow of boot block address determination of the host device 102B. At step 1001 in FIG. 10, the mode determination part 122 determines the start-up mode on the basis of the information inputted from the user interface part and the peripheral device configuration confirmation part. Next, at step 1002, the processor 111 determines the partition storing the program code corresponding to the start-up mode determined by the mode determination part 122. Then, at step 1003, the processor 111 determines a logical address at which the partition boot code that is the program code of the determined partition is stored, namely, determines a logical address of the partition boot code (LBA). Then, at step 1004, the processor 111 sends the logical address determined at step 1003 to the boot part address determination part 116. The boot part address determination part 116 converts the logical address into the boot block address (BBA) of the partition boot code by using the LBA-boot part conversion table 117.

At step 904 of FIG. 9, the host device 102B designates the boot block address of the partition determined in the above-mentioned manner and issues a reading command to the nonvolatile memory device 101B.

Then, the nonvolatile memory device 101B outputs the boot code of the partition designated at step 906. Using the partition boot code read at step 906, the processor 111 of the host device 102B carries out the start-up operation of the host device 102A based on the corresponding start-up mode.

Since the reading of the partition boot code here is the reading based on the designation of the boot block address, the code can be read in the same manner as that of the first embodiment when the nonvolatile memory device 101B is in the first state.

Meanwhile, the processor 105 of the nonvolatile memory device 101B resumes the interrupted initialization after outputting the boot code to the host device 102B at step 206.

After this, the host device 102B issues the initialization completion confirmation command from the nonvolatile memory device IF 113 at step 207. When the initialization process of the nonvolatile memory device 101B has not finished and the memory device is in the first state, the nonvolatile memory device 101B returns a response indicating incompletion of the initialization to the host device 102B at step 208. Here, the initialization confirmation command is a command for requesting an access to the partition other than the boot partition.

When the response returned at step 208 is notification of incompletion of the initialization, the host device 102B issues the initialization completion confirmation command again at step 209. When the nonvolatile memory device 101B finishes the creation of the logical-physical address conversion table 108, has been initialized, and is in the second state, the nonvolatile memory device 101B returns a response indicating the initialization completion to the initialization completion confirmation command from the host device 102B at step 210. The host device 102B recognizes due to the response of initialization completion that the data-writing and the data-reading based on the designation of logical address can be executed.

A flowchart of process in the nonvolatile memory device 101B to the host device 102B, which corresponds to the sequence diagram of FIG. 9, is the same as that of FIG. 3, and an explanation thereof will be omitted. In addition, a scheme for notifying the boot block address designated by a reading command from the nonvolatile memory device 101B to the host device 102B, which is executed at step 904 of FIG. 9, is the same as that of FIG. 6, and an explanation thereof will be omitted. After that, when the memory device is in the second state, the nonvolatile memory device 101B can read and write data of all logical addresses in all partitions.

As described above, the nonvolatile memory system according to the third embodiment can use the nonvolatile memory device 101B by dividing the memory device into a plurality of partitions, and the host device 102B chooses one of a plurality of the partitions in accordance with the start-up mode of the host device 102B and reads the boot code from the chosen partition. The host device 102B can read data of the program code based on the start-up mode earlier from the nonvolatile memory device 101B after power-on by preparing the first state where only the boot code of the partition can be read before the nonvolatile memory device is in the second state. Accordingly, the nonvolatile memory system can be started-up rapidly based on the start-up mode.

Fourth Embodiment

Figure 11:
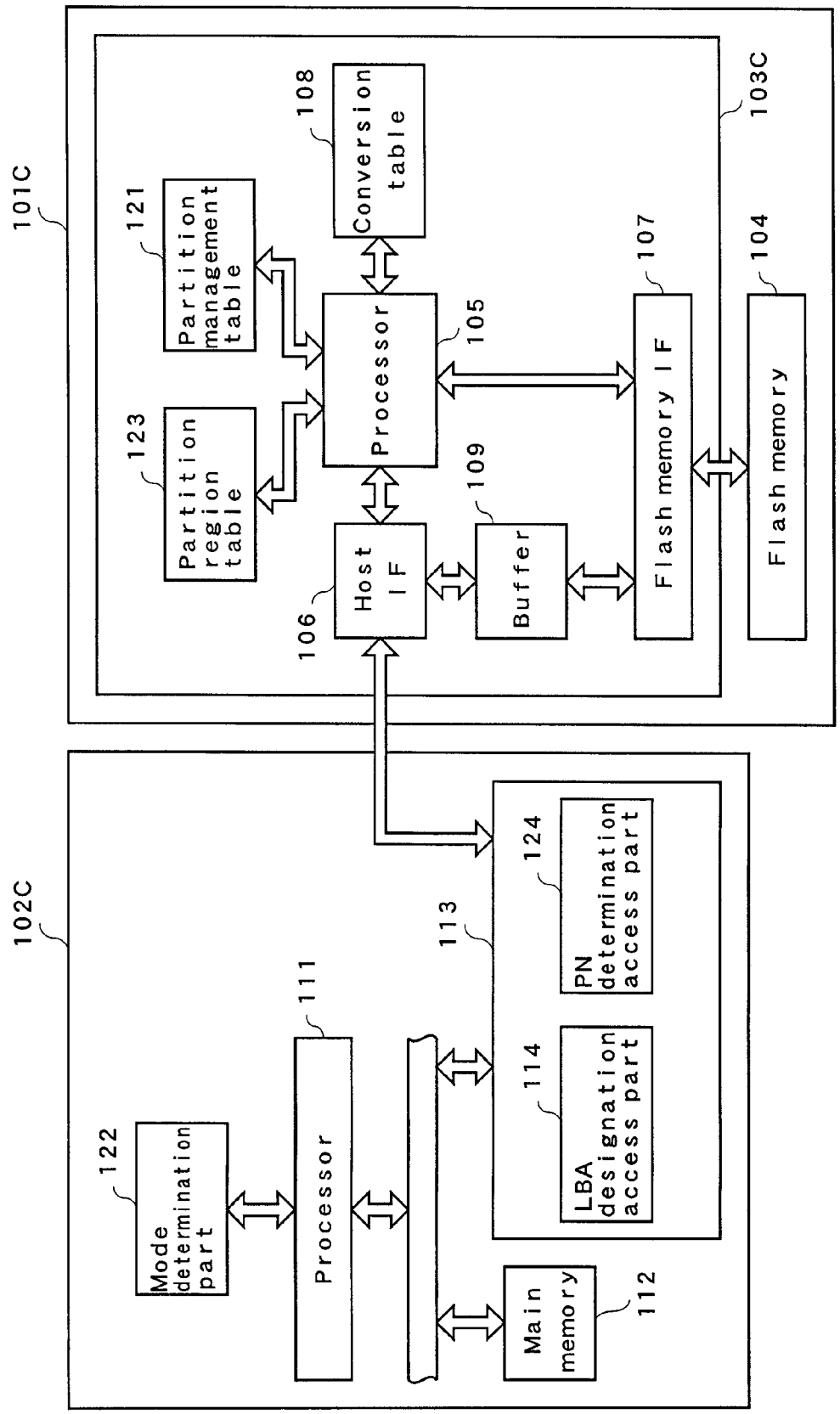
FIG. 11 is a view showing a configuration of a nonvolatile memory system according to a fourth embodiment of the present invention.

A nonvolatile memory system according to a fourth embodiment of the present invention will be explained. FIG. 11 shows a configuration of the nonvolatile memory system according to the present embodiment. Meanwhile, in FIG. 11, the same functional blocks as those of the nonvolatile memory systems shown in FIG. 1 and FIG. 7 are given the same numerals and the individual explanations thereof will be omitted. In the fourth embodiment, similar to the third embodiment, a host device 102C corresponds to the nonvolatile memory system that can use a nonvolatile memory device 101C by dividing the memory device into a plurality of partitions.

In FIG. 11, a partition region table 123 is a functional block additionally-included in the controller 103C in the nonvolatile memory device 101C compared to the controller 103C of FIG. 7, and the address scramble part 110 is deleted. The partition region table 123 is a table for relating physical addresses corresponding to the logical addresses registered in the partition management table 121 to the partition numbers to manage the physical addresses. Since also managing the physical address at which the boot code is stored, this table, like the address scramble part 110 of the first to third embodiments, corresponds to the boot address conversion table. In the present invention, the information of: the partition number; and the physical address corresponding to the first logical address of each partition is indispensable for the initialization of the controller. Accordingly, it is desirable for the partition region table 123 to be composed of a nonvolatile memory or to be composed of volatile memory under a condition where the information is written to a specific physical address position in the flash memory 104 that is a nonvolatile memory, so that the information can be read early to reflect the correct information on the partition region table 123.

In the host device 102C, a PN (Partition Number) designation access part 124 is additionally included in the nonvolatile memory device IF 113 compared to FIG. 7, and the BBA designation access part 115 is deleted. In addition, the boot part address determination part 116 and the LBA-boot part conversion table 117 composed of a nonvolatile memory are deleted. The PN designation access part 124 is an access part used for designating the partition number to the nonvolatile memory device 101C to read data.

FIG. 12 shows a configuration of the partition region table 123. The partition region table 123 shows a correspondence relationship between the partition number and the physical address storing a first logical page of the partition. A case where: physical address 456 stores data of a first logical address of partition of partition number 0; physical address 789 stores data of a first logical address of partition of partition number 1; and physical address 123 stores data of a first logical address of partition of partition number n is shown here. Meanwhile, physical addresses corresponding to a plurality of logical addresses starting from the first address may be stored without limiting to the first logical address.

FIG. 13 is a schematic diagram of an address conversion. In FIG. 13, a logical map on the left side shows a range of logical block address of the nonvolatile memory device 101A that the LBA designation access part 114 of the host device 102C can access. The left-side logical map and the central physical map are related each other with the logical-physical address conversion table 108. The right-side partition number is a number of partition of the nonvolatile memory device 101C that can be read by the PN designation access part 124 of the host device 102C. The right-side partition number is related to the central physical map in the partition region table 123. As described above, the partition region table 123 realizes an access based on the partition number to a part of region managed with the logical-physical address conversion table 108.

Figure 14:
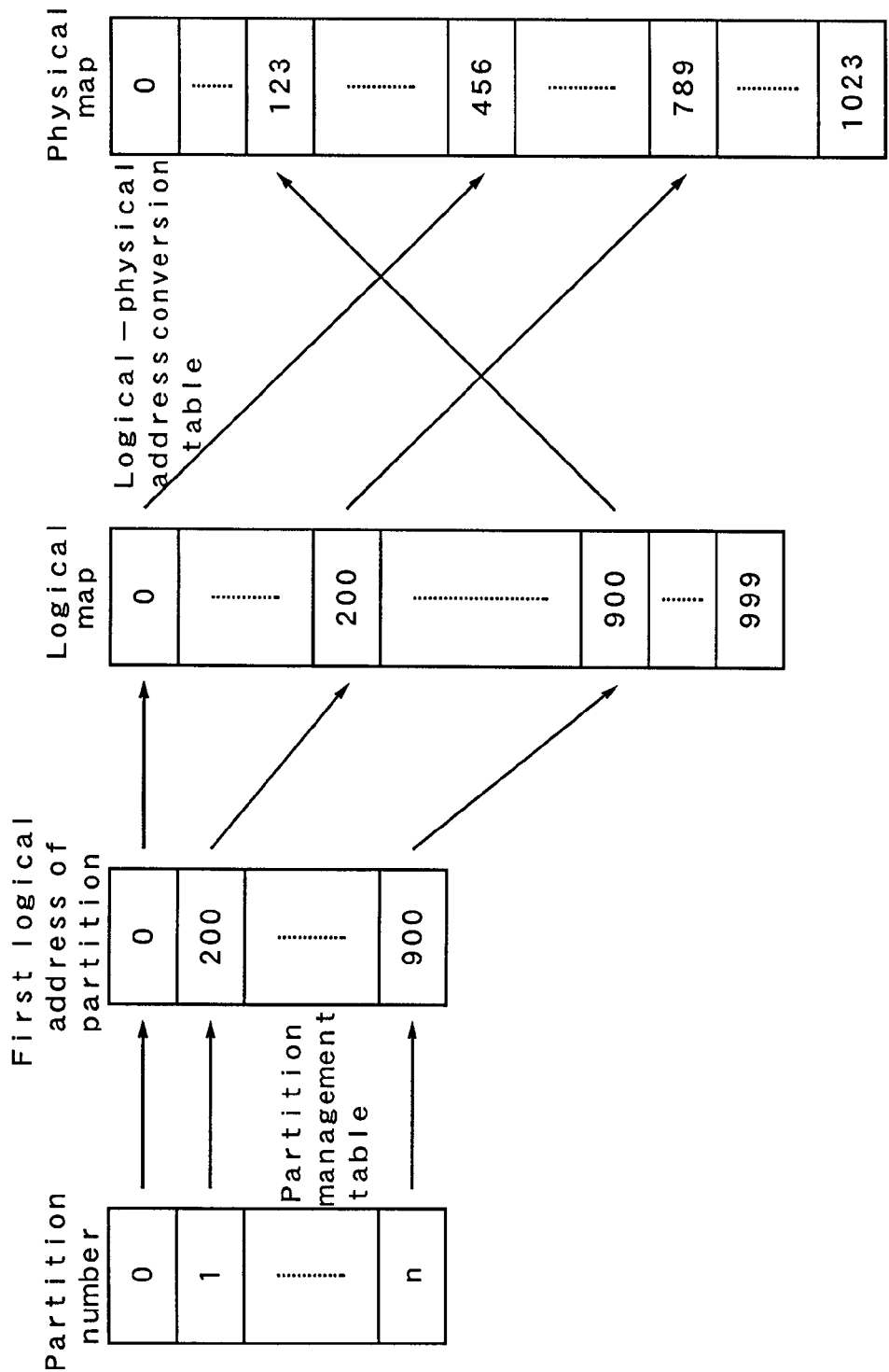
FIG. 14 is a schematic diagram of an address conversion of the nonvolatile memory system according to the fourth embodiment of the present invention.

FIG. 14 shows that the correspondence relationship managed in the partition region table 123 shown in FIG. 13 can be also realized by using the partition management table 121 and the logical-physical address conversion table 108. In FIG. 14, a relationship between the left-side partition number and the first logical address of each partition is given by the partition management table 121. As shown in FIG. 8, logical address 0 relates to partition number 0, logical address 200 relates to partition number 1, and logical address 900 relates to partition number n. When converting the first logical address of each partition obtained in this manner into a physical address in the logical-physical address conversion table 108, physical address 456 relates to logical address 0, physical address 789 relates to logical address 200, and physical address 123 relates to logical address 900. As a result, physical address 456 relates to partition number 0, physical address 789 relates to partition number 1, and physical address 123 relates to partition number n. This corresponds to the conversion in the partition region table 123 shown in FIGS. 12 and 13.

Figure 15:
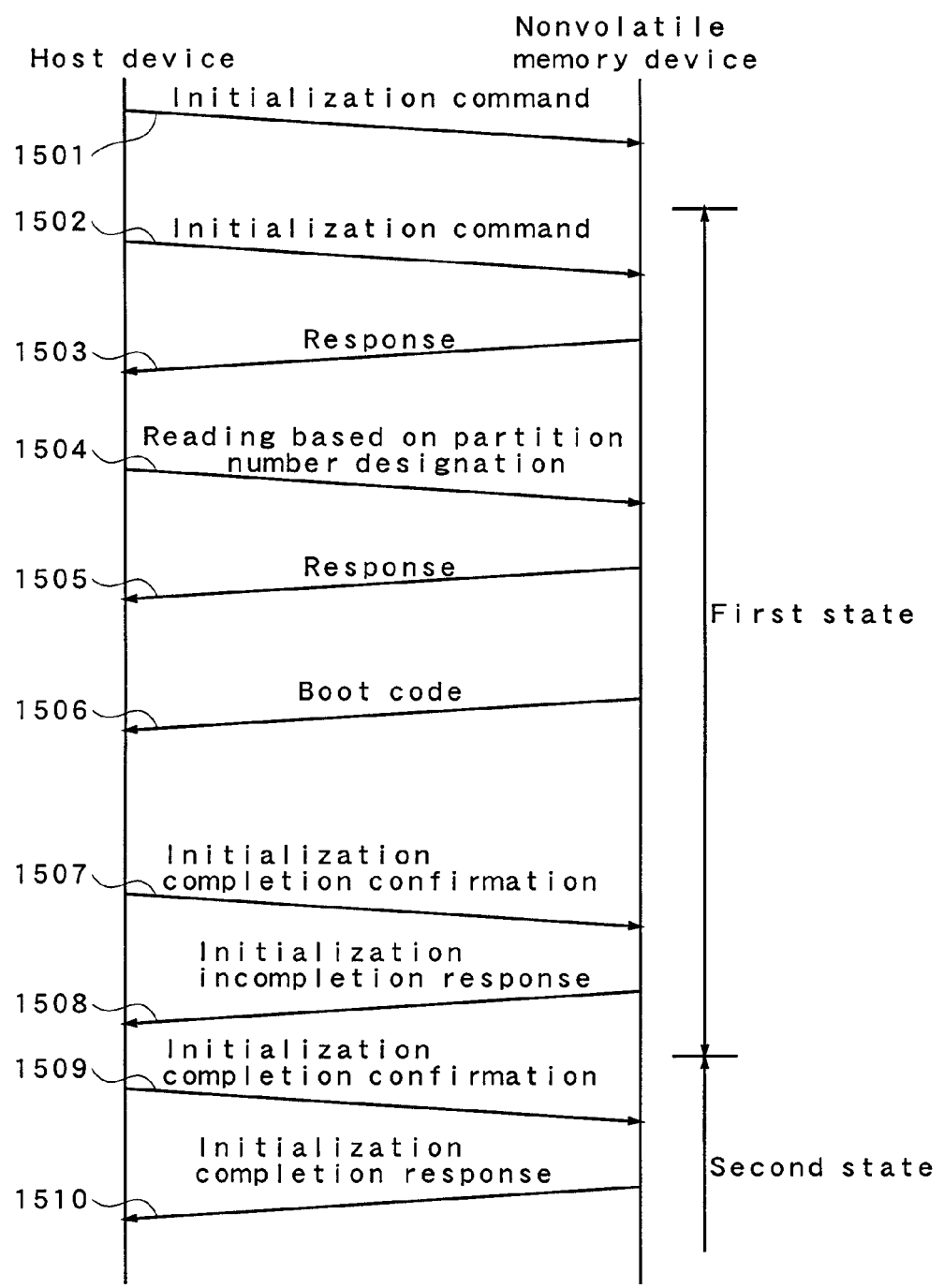
FIG. 15 is a sequence diagram of boot code reading of the nonvolatile memory system according to the fourth embodiment of the present invention.

Referring to FIG. 15, the reading of data of the program code of the partition according to the star-up mode in the nonvolatile memory system according to the present embodiment will be explained. FIG. 15 is a sequence diagram in the initialization between the host device 102C and the nonvolatile memory device 101C after the power-on.

At first, when the host device 102C applies a voltage to the nonvolatile memory device 101C, the processor 105 initializes the controller 103C (controller initialization). The controller initialization is a process for: resetting a register not shown in the drawings of each part of the controller; recognizing a type of the flash memory 104 connected to the controller 103C and the number of the arrays; and recognizing information related to a size and a characteristic of the nonvolatile memory device 101C by reading data stored in a specific region of the flash memory 104. Time required for the controller initialization is short within a few microseconds. In the case where the partition region table 123 is composed of a volatile memory, the correct information is reflected on the table by reading data from the flash memory 104 in a period of the initialization of the controller. Upon completion of the controller initialization, the nonvolatile memory device 101C is able to mutually communicate with the host device 102C. Additionally, in this state, data can be read from a specific region of the flash memory. A state after completion of the initialization of the controller 103C is a first state of the nonvolatile memory device 101C.

The host device 102C issues an initialization command to the nonvolatile memory device 101C via the nonvolatile memory device IF 113 at step 1501. The initialization of the nonvolatile memory device 101C is a process where the processor 105 in the controller reads management information from the flash memory 104 via the flash memory IF 107 and completes the logical-physical address conversion table 108 on the basis of the read data. Time required for completion of the initialization of the nonvolatile memory device 101C is approximately a few hundreds microseconds in actual time. Upon completion of the initialization of the nonvolatile memory device 101C, the host device 102C is able to designate a logical address to the nonvolatile memory device 101C to write and read data to and from the nonvolatile memory device 101C. A state after completion of the initialization of the nonvolatile memory device 101C is a second state of the nonvolatile memory device 101C.

Upon reception of the initialization command issued from the host device 102C at step 1501, the nonvolatile memory device 101C returns a response to the host device 102C when the nonvolatile memory device 101C is in the first state, and does not return the response when not still being in the first state. When the nonvolatile memory device 101C does not return the response to the initialization command at step 1501, the host device 102C can recognize that the nonvolatile memory device 101C is not still in the first state, namely, that the initialization of the controller 103C has not finished.

In order to initialize the nonvolatile memory device 101C, the host device 102C needs to issue the initialization command to the nonvolatile memory device 101C until the response is returned from the nonvolatile memory device 101C. Here, the host device issues the initialization command again at step 1502. When the initialization of the controller 103C in the nonvolatile memory device 101C has finished in receiving the initialization command at step 1502, the processor 105 returns a response to the initialization command at step 1502 via the host IF 106 at step 1503. Upon receiving the initialization command from the host device 102C, the nonvolatile memory device 101C starts the initialization process in the nonvolatile memory device 101C.

When the response is returned from the nonvolatile memory device 101C at step 1503, the host device 102C can recognizes that the initialization of the controller 103C in the nonvolatile memory device 101C finished and the nonvolatile memory device 101C has been in the first state. In the first state of the nonvolatile memory device 101C, data can be read only from a limited region.

The processor 111 of the host device 102C that recognized the nonvolatile memory device is in the first state determines the partition storing the program code corresponding to the start-up mode designated by the mode determination part 122. Then, the processor issues a reading command based on the partition number designation in accordance with the start-up mode at step 1504 via the PN designation access part 124. At the timing of step 1504, the initialization in the nonvolatile memory device 101C does not necessarily have to finish.

In response to the reading command based on the partition number designation at step 1504, the processor 105 of the nonvolatile memory device 101C firstly returns a response to the host device 102C at step 1505. Then, the processor 105 interrupts the creation of the logical-physical address conversion table 108 once, and referring to the partition region table 123, converts the partition number designated with the reading command based on the partition number into the corresponding boot part physical address of the flash memory 104. The processor 105 designates the boot part physical address, reads data of the boot code from the flash memory 104, temporarily stores the data in the buffer memory 109, and then outputs the boot code to the host device 102C at step 1506.

The processor 111 of the host device 102C sends the read boot code to the main memory 112 via the nonvolatile memory device IF 113. The processor 111 starts the host device 102C by using the boot code sent to the main memory 112.

According to the above-mentioned data reading sequence for the boot code, the host device 102C can execute the reading of the boot code from the nonvolatile memory device 101C in the first state where the initialization of the controller 103C after the power-on finishes and without waiting for being in the second state. This is because the host device 102C can convert the number of the partition into the boot part physical address by using the partition region table 123 and read data from the flash memory 104 when designating a number of the partition corresponding to the start-up mode and issuing a reading command to the nonvolatile memory device 101C.

Meanwhile, after outputting the boot code to the host device 102C at step 1506, the processor 105 of the nonvolatile memory device 101C resumes the interrupted initialization.

The process after step 1507 is the same as the conventional process. The host device 102C issues the initialization completion confirmation command from the nonvolatile memory device IF 113 at step 1507. When the initialization process of the nonvolatile memory device 101C has not finished and the memory device is in the first state, the memory device returns a response indicating incompletion of the initialization to the host device 102C at step 1508.

When the response indicating incompletion of the initialization is returned at step 1508, the host device 102C issues the initialization completion confirmation command again at step 1509. When the memory device is in the second state after completion of the initialization of the nonvolatile memory device 101C, the nonvolatile memory device 101C returns a response indicating the initialization completion to the host device 102C at step 1510 in response to the initialization completion confirmation command from the host device 102C to the nonvolatile memory device 101C. By returning the response indicating the initialization completion, the nonvolatile memory device 101C notifies the host device 102C that the data-writing and data-reading based on the logical address designation can be carried out.

Figure 16:
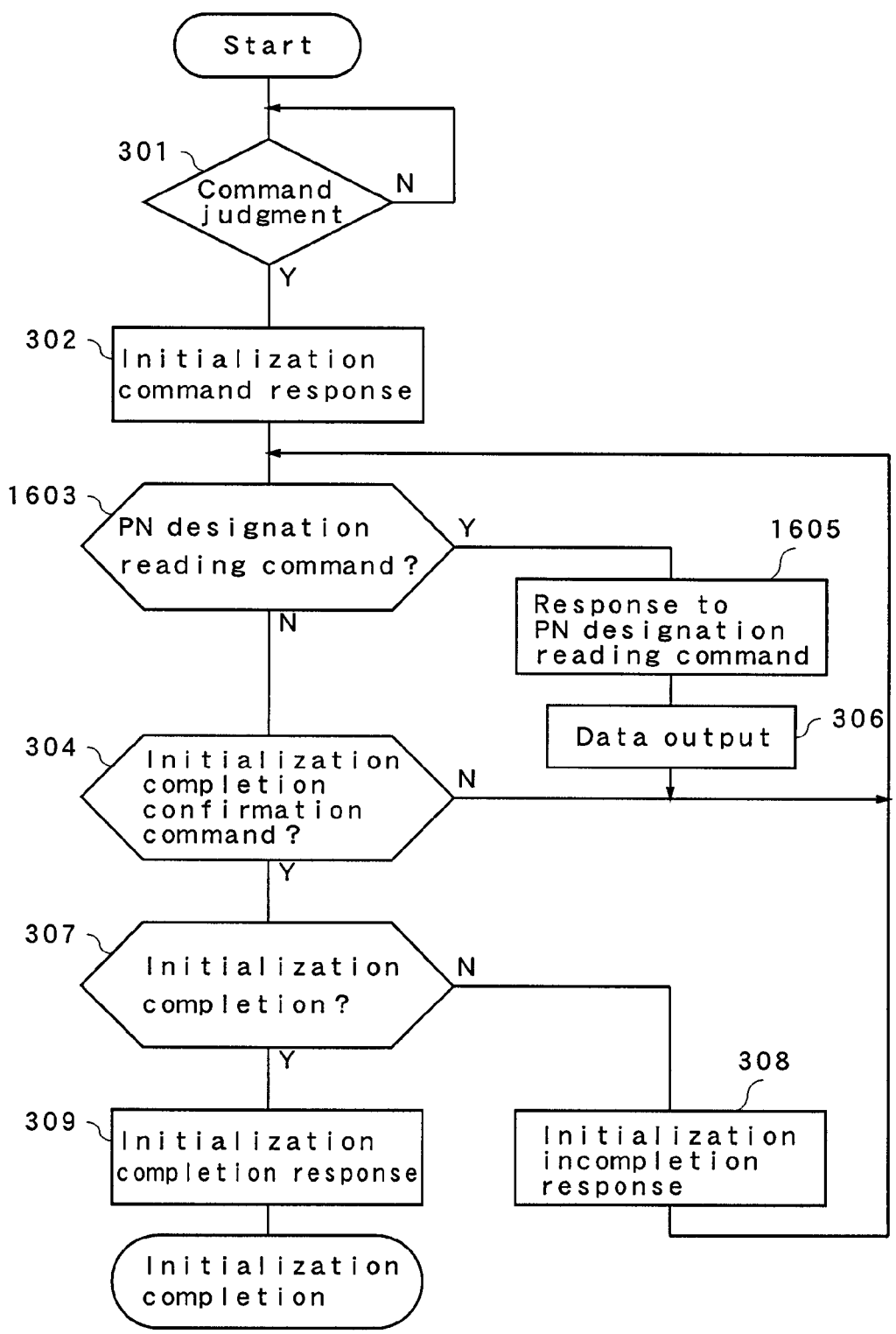
FIG. 16 is a flowchart in a nonvolatile memory device of the nonvolatile memory system according to the fourth embodiment of the present invention.
Figure 17:
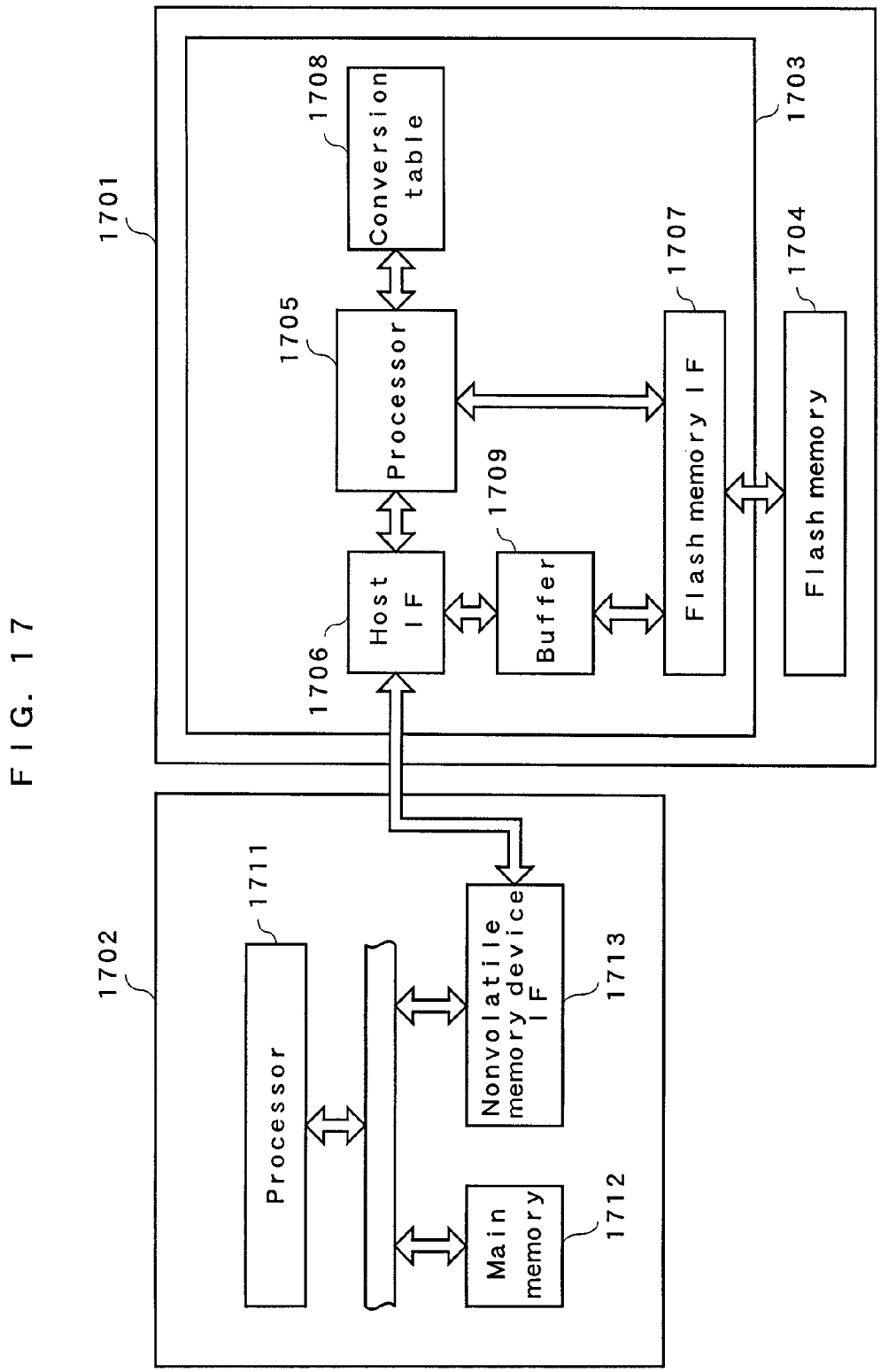
FIG. 17 is a view showing a configuration in a nonvolatile memory device of a conventional nonvolatile memory system.
Figure 18:
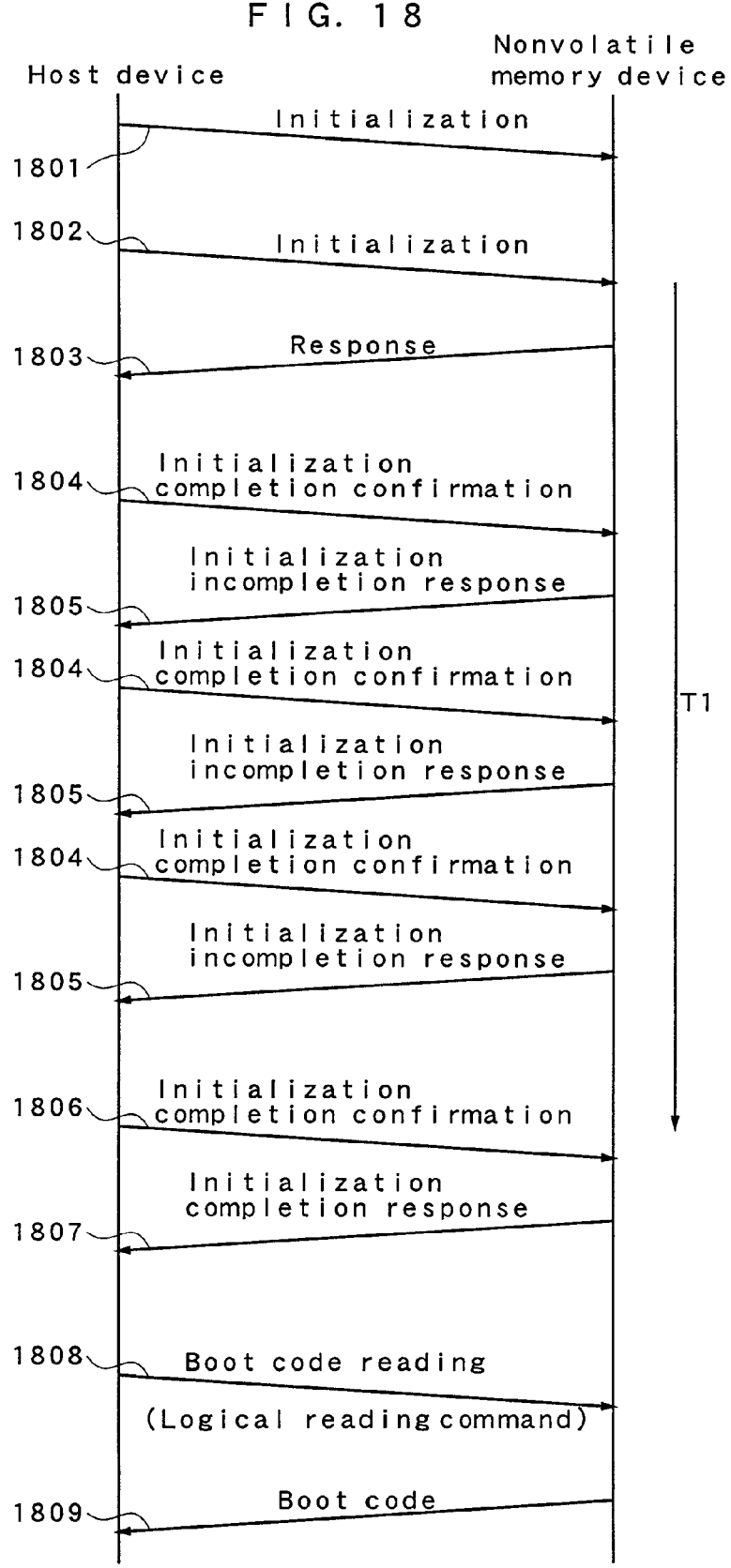
FIG. 18 is a sequence diagram of boot code reading of the nonvolatile memory system according to the conventional embodiment.
Figure 19:
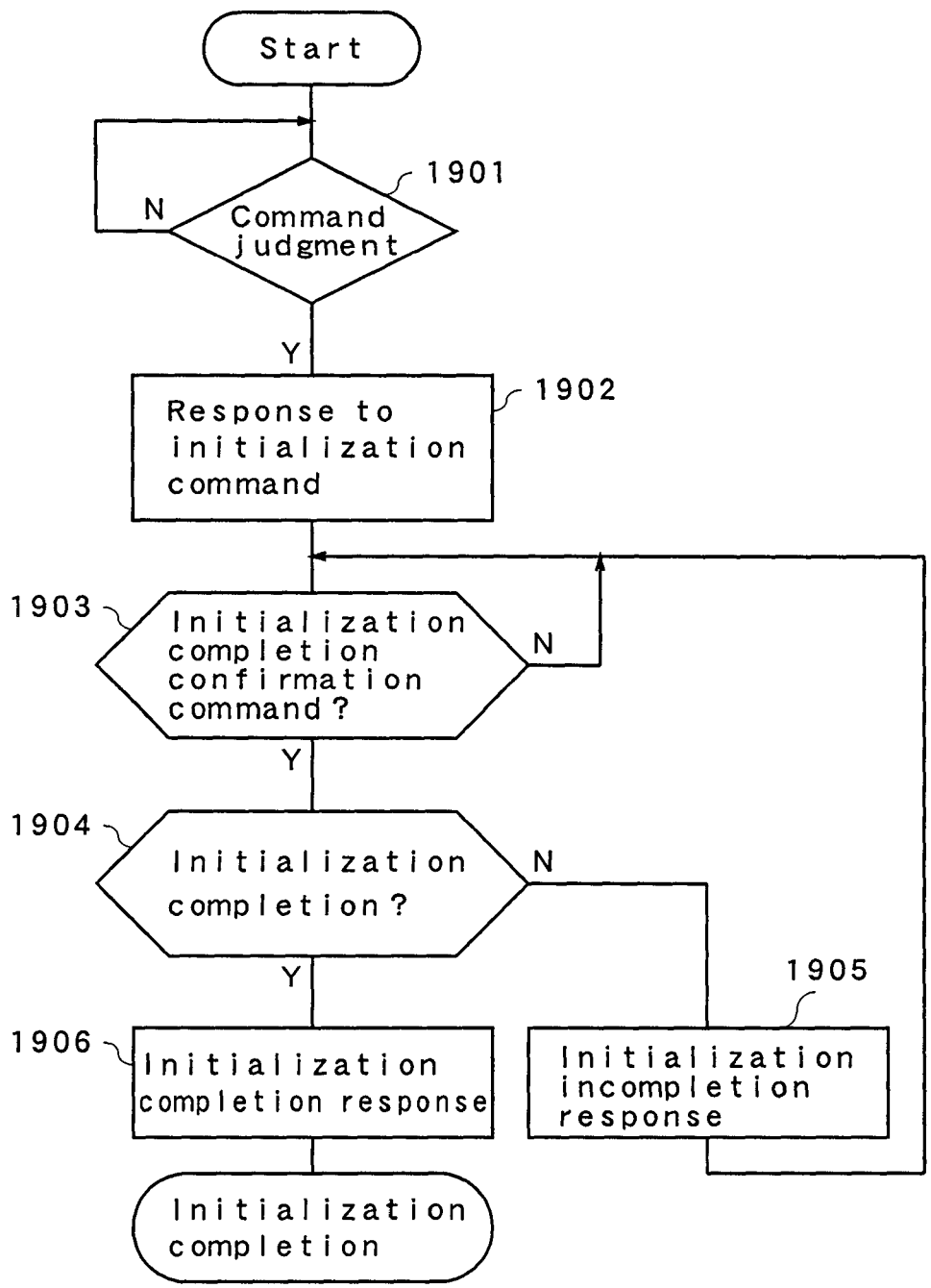
FIG. 19 is a flowchart in the nonvolatile memory device of the nonvolatile memory system according to the conventional embodiment.

FIG. 16 shows a flowchart of a process to the host device 102C of the nonvolatile memory device 101C, the flowchart corresponding to the sequence diagram of FIG. 15. The same numerals as those of FIG. 3 are given portions in which the same judgment and determination as those of FIG. 3 are carried out, and the explanations thereof will be omitted.

In the case where the reading command based on the partition number designation at step 1504 is issued from the host device 102C, the processor 105 recognizes that the command inputted via the host IF 106 at step 1603 is the reading command based on the partition number designation. On this occasion, the flow proceeds to state 1605, the memory device returns the response at 1505 and interrupts the initialization process started from state 302 in the nonvolatile memory device 101C. And, the memory device converts the designated partition number into a physical address of the flash memory 104 by using the partition region table 123. Then, the memory device reads the boot code corresponding to the designated partition from the flash memory 104 by designating the converted physical address to the flash memory IF 107, and sends the boot code to the buffer memory 109. Furthermore, the memory device outputs data to the host device 102C at state 306. Then, the processor resumes the initialization process in the nonvolatile memory device 101C, and the flow shifts to state 1603.

As described above, in the nonvolatile memory device 101C of the nonvolatile memory system of the present invention, the host device 102C can read data of the program code of the partition corresponding to the start-up mode from the nonvolatile memory device 101C earlier after the power-on by preparing the first state where the reading can be carried out on a part of region in which the reading and writing can be carried out in the second state before being in the second state where the data-reading and data-writing can be carried out on the nonvolatile memory device 101C. Thus, the nonvolatile memory system can be started early.

Meanwhile, the present invention has explained the case where data is read by using the partition region table 123 in the first state from a part of the region that is usable in the second state and is related in the logical-physical address conversion table 108 as shown in FIG. 13. If being accessible in the second state, the region does not necessarily have to be related in the logical-physical address conversion table 108. Since the boot code is read in the first state, the reading and writing in the second state may be carried out by using another highly-reliable and highly-confidential address conversion means.

In addition, the present invention has explained the case where the first logical address of each partition is converted into a physical address by using the partition region table 123 as shown in FIG. 13. The present embodiment may employ a table for converting a plurality of logical address starting from the first address into physical addresses in a specific partition. In this case, all logical blocks included in the partition may be converted into physical blocks. When the initialization to set the first state can end sufficiently earlier than the creation of the logical-physical address conversion table 108 usable in the second state, the effect of the present invention can be achieved.

INDUSTRIAL APPLICABILITY

In a nonvolatile memory system that stores a program code for starting a system of the nonvolatile memory device, the present invention is useful for a nonvolatile system that can rapidly start the system and has an improved user convenience.

The invention claimed is:

1. A nonvolatile memory device, comprising:
   a nonvolatile memory operable to store data; and
   a controller operable to control reading and writing data to the non-volatile memory,
   wherein the controller performs an initialization process which initializes a boot partition of the nonvolatile memory,
   after the initialization process of the boot partition is complete, the controller receives, from an external device, a command for reading a boot code, the controller reads the boot code from a predetermined area of the nonvolatile memory and outputs the read boot code to the external device, and after outputting of the boot code, the controller performs an initialization process which initializes a partition other than the boot partition of the nonvolatile memory.

2. A nonvolatile memory system comprising:
   a nonvolatile memory device;
   a host device;
   wherein the host device includes an interface operable to send a command for reading a boot code to the nonvolatile memory device after power-on of the nonvolatile memory device,
   the nonvolatile memory device includes:
   a nonvolatile memory operable to store the boot code in a predetermined area and store user data in an area other than the predetermined area, and
   a controller operable to control reading and writing of data to the nonvolatile memory,
   wherein the controller performs an initialization process which initializes a boot partition of the nonvolatile memory,
   after the initialization process of the boot partition is complete, the controller receives, from the interface, a command for reading the boot code, the controller reads the boot code from the predetermined area of the nonvolatile memory and outputs the read boot code to the interface, and after outputting of the boot code, the controller performs an initialization process which initializes a partition other than the boot partition of the nonvolatile memory.

* * * * *